United States Patent [19]
Matsumoto et al.

[11] 4,245,245
[45] Jan. 13, 1981

[54] INTERACTIVE CATV SYSTEM

[75] Inventors: Katsuaki Matsumoto; Yoshifumi Saeki; Osamu Tazawa; Minoru Kosaka; Masaki Saito; Hiroki Uemura; Tetuo Kanazashi; Seiji Hashimoto; Tsuyoshi Fujiwara; Tsutomu Fukui, all of Tokyo; Saburo Takaoka, Tokorozawa; Tsutomu Suzuki, Tokorozawa; Shozo Nakamuta, Tokorozawa; Toshihiko Hosaka, Tokorozawa; Kuniaki Shiratori, Tokorozawa; Youichiro Tsuda, Tokorozawa; Takashi Morii, Tokorozawa; Sumitaka Matsumura, Tokorozawa; Morihisa Oka, Tokorozawa, all of Japan

[73] Assignee: Pioneer Electronic Corporation, Tokyo, Japan

[21] Appl. No.: 654,721

[22] Filed: Feb. 2, 1976

[30] Foreign Application Priority Data

Feb. 24, 1975 [JP] Japan .................................. 50/23041

[51] Int. Cl.³ .......................... H04N 7/16; H04N 7/00; H04N 7/16
[52] U.S. Cl. ..................................... 358/122; 358/84; 358/114; 358/118; 358/121; 358/123
[58] Field of Search ............ 178/5.1, DIG. 13, 70 TS; 179/15 AD; 358/84, 86, 114, 121, 122, 123, 124, 118

[56] References Cited

U.S. PATENT DOCUMENTS

| 3,078,337 | 2/1963 | Shanahan et al. | 358/84 |
| 3,668,307 | 6/1972 | Face et al. | 358/86 |
| 3,729,576 | 2/1971 | Court | 178/5.1 |
| 3,757,035 | 9/1973 | Sullivan | 178/5.1 |
| 3,790,700 | 2/1974 | Callais et al. | 358/84 |
| 3,836,888 | 9/1974 | Boenke et al. | 178/DIG. 13 |
| 3,889,054 | 6/1975 | Nagel et al. | 178/DIG. 13 |
| 3,919,462 | 11/1975 | Hartung et al. | 178/5.1 |
| 3,934,079 | 1/1976 | Barnhart | 178/5.1 |
| 3,944,742 | 3/1976 | Cunningham | 178/DIG. 13 |

Primary Examiner—Stephen C. Buczinski
Attorney, Agent, or Firm—Fraser and Bogucki

[57] ABSTRACT

A two-way CATV system having a substantial number of terminals incorporates a central processor and transmitter system which continually interrogates the terminals at high speed, monitoring changes of usage of premium programs and other data while also permitting central control of access to restricted premium programs. For inexpensive but reliable intercommunication, short, fixed word length digital messages are frequency multiplexed onto the cable in both upstream and downstream directions, and subscriber groups are controllably selected in turn, with each subscriber being scanned in what may be an arbitrary order by transmission of unique private messages which are recognized at the terminal and in response to which previously prepared fixed length messages are immediately transmitted in return. By employing both upstream and downstream messages which are initiated by a series of synchronizing bits and non-ambiguously related subsequent data sequences, and by the provision of means to initiate both downstream and upstream messages of short length without delay, rapid but reliable data interchange is effected despite differences in transmission and response times with different subscribers. Concurrently, terminal status and various special conditions including security alarms are remotely processed at each terminal, and short upstream messages are assembled containing priority selected data to be transmitted in response to an interrogation. The system incorporates additional means for monitoring power status, program selection and authorization and other operating conditions at each terminal effectively to provide accurate and reliable accounting information while preventing unauthorized or improper usage of restricted premium programs.

22 Claims, 35 Drawing Figures

FIG. 10

| Data | 1 0 1 1 0 1 0 0 0 1 | |
|---|---|---|
| NRZ-(L) | | EACH 1 BIT FOR LEVEL H FOR DATA (1), LEVEL L FOR DATA (0) |
| NRZ-M (NRZ=L) | | LEVEL CHANGES FOR DATA MARK (1), LEVEL MAINTAINED FOR DATA MARK (0) |
| NRZ-S | | LEVEL CHANGES FOR DATA SPACE LEVEL KEPT FOR DATA MARK |
| RZ | | 1/2 BIT FOR LEVEL H FOR DATA (1) LEVEL L FOR DATA (0) |
| SPLIT PHASE (Bi-PHASE -L) | | + LEVEL CHANGES FOR DATA (1), - LEVEL CHANGES FOR DATA (0) |
| SPLIT PHASE -S (Bi-PHASE -S) | 1 0 1 1 0 1 0 0 0 1 | CHANGING DIRECTION ALTERS FOR DATA MARK, CHANGING DIRECTION NOT ALTERED FOR DATA SPACE |
| SPLIT PHASE -S (Bi-PHASE -M) | 1 0 1 1 0 1 0 0 0 1 | CHANGING DIRECTION NOT ALTERED FOR DATA MARK, CHANGING DIRECTION ALTERED FOR DATA SPACE |
| PULSE WIDTH | | 3/4 BIT PULSE FOR DATA (1), 1/4 BIT PULSE FOR DATA (0) |
| DIPOLAR RZ | | +1/2 PULSE FOR DATA (1), -1/2 PULSE FOR DATA (0) |
| D.T | | CHANGES -,0,+,-, FOR DATA (1), -,0,-,+, FOR DATA (0) |
| P.S.T | | + PULSE FOR DATA (1 0), 0 - FOR DATA (0 0 1), - + for data (0 0) |

SINUSOIDAL GRAY-SYNC sync  start  index  address  isolation  address  sync ( data : 01001010101 )

FIG. 18
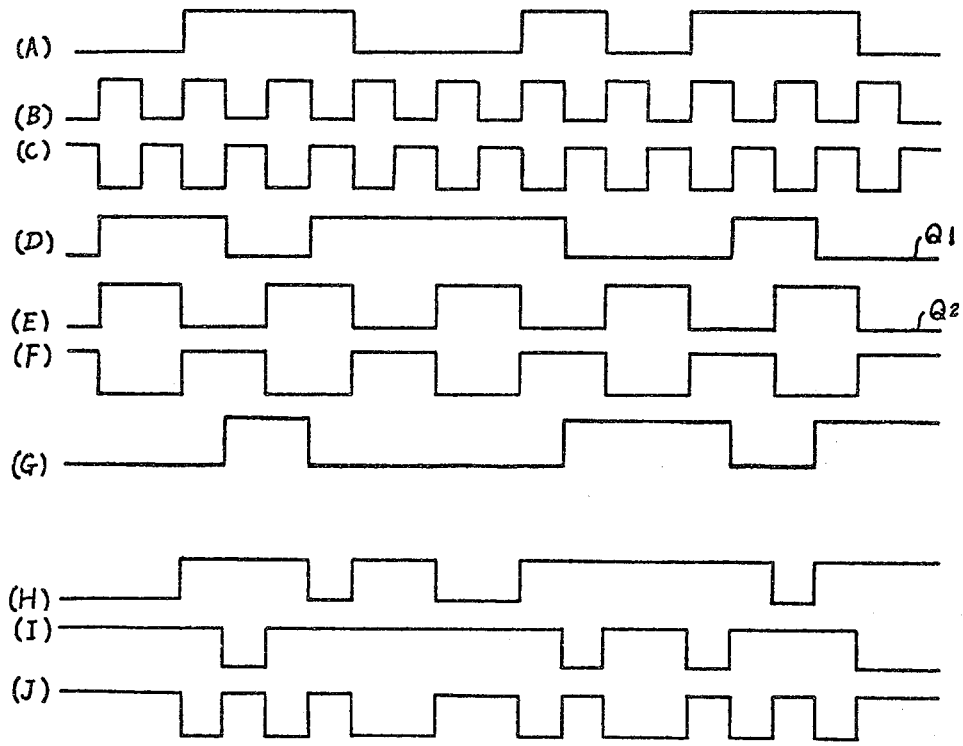
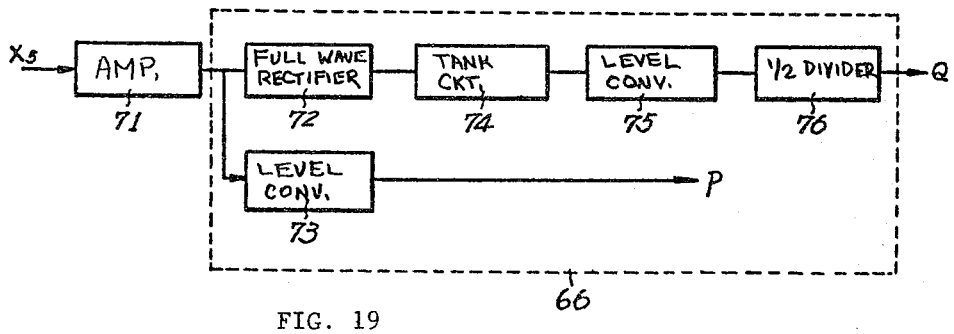
FIG. 19

FIG. 32
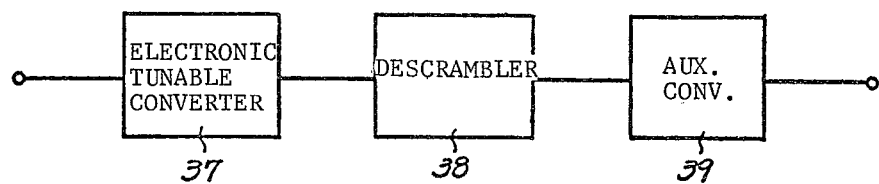
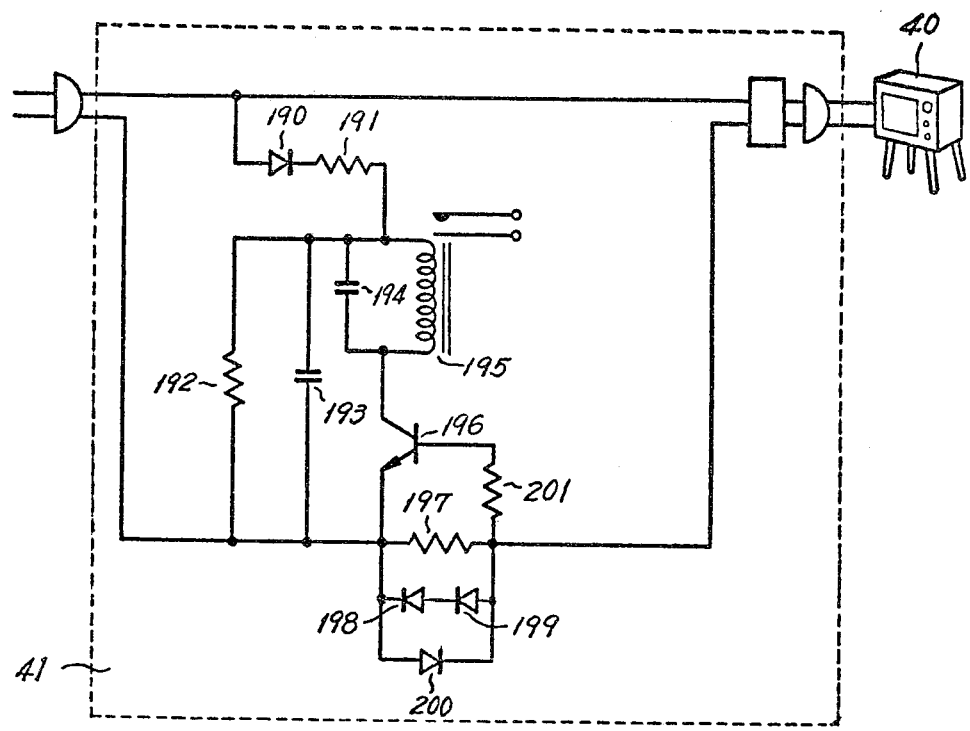
FIG. 33

INTERACTIVE CATV SYSTEM

BACKGROUND OF THE INVENTION

This invention relates to CATV and pay TV, and more particularly to two-way CATV systems.

There have been many variations of pay television and subscription television systems, such as over-the-air, coin operated, multiple wiring, and other configurations, most of which have not been commercially employed to any great extent although the subject of much patent literature. The field of community antenna television systems, or CATV, has more recently tended toward usage of modern electronic communication and data processing techniques and a substantial body of art has developed in what are known as two-way or bidirectional CATV systems. In the category of systems with which the present disclosure is concerned, a central station is employed which includes some type of processing and interrogating system, now typically a general purpose or special purpose computer having both substantial storage and processor capability. The central station also includes television transmission facilities for transmitting a substantial number of programs, some of which are "free" programs for the subscribers, and the extent of use of which need not be monitored, while other programs are special or premium programs such as first run motion pictures, the selection of which by a subscriber requires an appropriate payment. There are also other possible categories of programs, including particularly the specialized or limited access type of program, here termed restricted premium programs, to which only certain subscribers are to be permitted access. These may include, for example, specialized presentations for professional medical, legal, business, social or governmental groups.

There are a number of approaches to controlling access to programs in a two-way CATV, some of which involve recording systems, coin operated systems, special pre-paid descramblers and the like. These approaches however are characterized by the common difficulties of cumbersome and unreliable accounting, supply or collection procedures, and it is generally preferable to utilize the central control and accounting functions of a two-way CATV system for such purposes. A number of two-way CATV systems are known which incorporate features intended to provide a degree of central control and monitoring of program content and usage. Some of such systems employ frequency division multiplexing for data interchange, with a number of different frequencies being utilized in combination to effect command and control. More advanced systems utilize a combination of serial digital data in both upstream and downstream directions that is frequency multiplexed with the video and audio channels, and interrogate the terminals using a time division multiplex mode. Some of such systems employ a combination of frequency shift keying in one band in the downstream direction, with phase shift keying in another band in the upstream direction, to simplify the receiving and transmitting circuitry at the numerous subscriber terminals. Circuits may also be employed at the terminals for assembling messages to be returned to the central station.

The most relevant art pertaining to advanced two-way CATV systems using FSK or PSK upstream and downstream transmissions discusses, but does not show, high speed interrogation or polling techniques. A number of treatments can be found in the literature as to the general organization of systems for high speed interrogation of the subscriber terminals, sometimes only in intermittent fashion as at the start of a program, and other times in overlapping precisely sequenced fashion in which successively more remote subscribers are interrogated in turn. There are descriptions in the literature of systems intended to serve hundreds of thousands and even up to a million subscribers. Such generalized treatments do not confront the substantial technical problems that are encountered in practice in communicating between a central station and a substantial number, say 10,000 to 20,000 or more, of subscribers. In a multiple branch network of this kind the signals are in fact delayed, distorted and attenuated from many causes and to varying extents, so that intercommunication is far from ideal. Cumulative delays from various sources greatly reduce the interrogation rate, if reliable intercommunication is to be achieved, but there is a particular need for correct data in a CATV system because of the inevitable customer reaction to incorrect billings.

There is a separate line of development in communications and CATV technology, in which special noise measuring or distortion measuring circuits are included in the system, along with controllable mechanisms for selectively adjusting the gain, bandpass, slope and other amplifier characteristics, or for selectively blocking off sources of noise in the system in order to enable one remote transmitter out of a substantial number of transmitters to be received at the central station with a signal having an adequate signal-to-noise ratio. Extensive controls of this kind, however, not only impose a substantial economic burden on the system, but also demand processor and equipment time and involve their own operating problems.

An interactive two-way CATV system should be able to provide useful interchanges between the central station and the individual terminals. Some systems have gone as far as to propose transmission of both video and audio in both directions between the subscribers and the central station, or between individual subscribers. The incorporation of such features, however, would not permit general usage in CATV systems, because of the attendant cost. Systems are known which provide a number of individual desirable features, such as program previewing without cost, accurate accumulation of usage data, protection against unwanted usage of pay programs, ability to interrogate subscribers, and capability for indicating the existence of fire, emergency or other alarm conditions. However, such features have generally been provided on an isolated basis in individual systems, and the prior art has not heretofore disclosed an arrangement that is at the same time highly versatile, economical and of practical utility.

The following patents are illustration of the art:

| U.S. Pat. Nos. | | |
|---|---|---|
| 3,050,712 | George Bruck | Aug. 21, 1962 |
| 3,130,265 | Eugene Leonard | April 21, 1964 |
| 3,230,302 | George Bruck et al | Jan. 18, 1966 |
| 3,387,083 | Richard J. Farber et al | June 4, 1968 |
| 3,668,307 | William W. Face et al | June 6, 1972 |
| 3,676,580 | Joseph H. Beck | July 11, 1972 |
| 3,733,430 | John R. Thompson et al | May 15, 1973 |
| 3,750,022 | Samuel J. Curry et al | July 31, 1973 |
| 3,786,424 | David S. McVoy et al | Jan. 15, 1974 |
| 3,790,700 | Richard T. Callais et al | Feb. 5, 1974 |
| 3,794,922 | William Osborn et al | Feb. 26, 1974 |

-continued

| U.S. Pat. Nos. | | |
|---|---|---|
| 3,796,829 | Robert G. Gray | March 12, 1974 |
| 3,803,491 | William Osborn | April 9, 1974 |
| 3,806,814 | F. Douglas Forbes | April 23, 1974 |
| 3,832,690 | David S. McVoy et al | Aug. 27, 1974 |
| 3,833,757 | Donald Kirk, Jr. et al | Sept. 3, 1974 |
| 3,846,703 | Floyd C. Stewart et al | Nov. 5, 1974 |
| 3,859,596 | George E. Jannery et al | Jan. 7, 1975 |
| 3,882,392 | Ralph P. Harney | May 6, 1975 |
| 3,885,089 | Richard T. Callais et al | May 20, 1975 |
| 3,886,302 | Thomas J. Kosco | May 27, 1975 |
| 3,886,454 | Charles B. Oakley et al | May 27, 1975 |
| 3,889,050 | Wallace T. Thompson | June 10, 1975 |
| 3,916,091 | Donald Kirk, Jr. et al | Oct. 28, 1975 |

SUMMARY OF THE INVENTION

Systems in accordance with the invention provide repetitive high speed interrogation of a substantial number of subscribers with short fixed length word messages which control the selection of groups of subscribers and then control intercommunication with individual subscribers within a group, the individual subscribers responding immediately with short fixed length word messages. Both upstream and downstream messages at a given point in time are priority determined, so that essential controls and responses may be distributed over a sequence of interchanges. The combination of short messages, reduced addressing time, priority ordering of data, immediate responses and processing only of change of status enables real time monitoring of the status of many subscribers' terminals to be effected precisely and reliably. Interactive control functions are concurrently effected by a terminal processor, converter and descrambler system that provides access to scrambled premium programs while being responsive not only to subscriber selection and control inputs, but also to central commands and localized power sense, premium authorization and special alarm inputs.

In a high speed interrogation system in accordance with one example of the invention, the central system generates relatively short fixed length messages having an initiating synchronizing sequence of fixed length and including bits of a given value, followed by at least two data sequences of shorter length, separated by at least one bisecting bit of a value different from that of the synchronizing bits. These messages include both a group address message and a private address message which is accompanied by command data and enable the reliable reception and decoding of digital data despite the fact that signal transmissions may occur at arbitrary points in time and be subject to substantial signal distortion and propagation delays. Despite the fact that different signal sequences are sent for different purposes, they are arranged to be unambiguously related so that the synchronizing sequences cannot be confused with each other and the private address cannot be confused with the group address. At the subscriber's terminals, responses are generated by pre-assembling priority ordered fixed length messages of short duration. Continually running oscillators are used together with gated frequency dividers to provide substantially immediate response to interrogations. In addition, the system includes means independent of the central processor for monitoring transmissions and receptions to detect the occurrence of failure conditions, excessive delay between a transmission and the succeeding response signal, or excessive delay between successive responses.

Interactive systems in accordance with the invention utilizing this upstream and downstream message capability transmit commands in the downstream direction and transmit status and response information in the upstream direction. The electronically controllable converter and descrambling units at the terminal are inhibited under central control only when unauthorized access to restricted premium programs is sought. Operation of the subscriber's television set is automatically detected, and is selectively used to initiate operation of a refresh sequence in which a predetermined channel is displayed. Security and alarm indications, and subscriber responses to questionnaires, are also provided as inputs to the terminal processor, and transmitted as priority-ordered data to the central station.

BRIEF DESCRIPTION OF THE DRAWINGS

A better understanding of the invention may be had by reference to the following invention taken in conjunction with the accompanying drawings, in which:

FIG. 10 is an explanatory chart for various code formats for use with the transmission of digital signals;

FIG. 18 comprises a group of waveforms showing each of the signals in the device shown in FIG. 17 and the converted states thereof;

FIG. 19 is a block diagram showing the construction of the clock pulse detector;

FIG. 32 is a block diagram showing the arrangement of an auxiliary converter; and FIG. 33 is a combined schematic and generalized view showing the construction of a power sensor.

DETAILED DESCRIPTION OF THE INVENTION

Figure 1A:
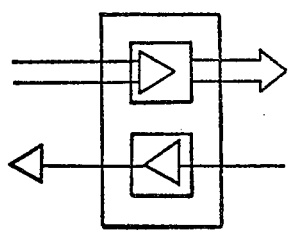
FIG. 1A is a diagram showing the construction of a wired transmission path showing a dual cable system employed in a two-way CATV system according to the present invention.

The present invention relates to a two-way CATV system the primary object of which lies in providing a system in which a central control unit and each of the TV subscribers are closely interconnected to thereby properly offer to the subscribers desired programs from said central control unit as well as exactly account and record the fees for the offering of the programs to perform the program offering service smoothly. This invention of course has various other auxiliary objects attainable based on the many features thereof other than the foregoing principal one, which are to be detailed hereinafter. It should, however, be understood that a system according to the present invention has novel features different from those found in common to the conventional CATV systems. As is already known, a CATV system is basically intended to enable video image reception of satisfactory quality from radio waves captured by a common reception antenna for the aim of providing to those TV viewers, who are in areas remote from TV broadcasting stations and in areas liable to suffer from radio wave interference, benefits comparable to those enjoyed from TV broadcasting in areas in which preferred reception conditions are obtainable, and further as the case may be to enable a TV image to be received even with weak signals in areas usually not capable of reception. The development of this system has promoted further provision for re-transmission to system subscribers thus to bring about the construction and operation of a central control unit for re-transmission and other facilities. A central control unit constructed primarily for such common reception facility has further been utilized, beyond its original purpose of re-transmission, for local TV broadcasting by making effective use of facilities that are inherently provided thereto. This, accompanied with the development of video recording apparatus, enables realization of the possibilities for a pay-TV broadcasting system which is capable of offering programs under special contracts through wired broadcasting as well as providing a remarkably wider range of program selection for viewers in the specified system area in addition to the usual reception of air-propagated radio waves.

According to the present invention, a new CATV system is proposed wherein subscribers can be presented with pay program service by means of special contracts with the central control unit by the provision of terminal units of their own or on lease. Where pay-program services are provided, high reliability is necessarily required for ensuring the proper offering to subscribers under special contract of programs they want to see at any time they desire. In addition, smooth operation of the system can be expected only when suitable counter measures are taken for inhibiting the reception of the programs by those other than the contacted subscribers thus to effectively prevent the reception by unauthorized viewers, through unjust means or the like. At the same time, in collecting fees from the contracted subscribers, exact accounting of fees for the frequency and length of time period of reception must be made in addition to the fundamental subscription fees. This brings about the necessity of an automatic recording of the reception status of a contracted subscriber and further the automatic issue of bills at periodical intervals.

It is, therefore, a principal object of the present invention to provide solutions for the foregoing various technical problems by which realization of a pay-TV system useful for practical applications is achieved and in which the central control unit and contracted subscribers having terminal units are connected through repeating wired transmission networks inherent of this type of the system thereby also intending to provide special advantage for full utilization.

Accordingly, auxiliary objects of the present invention include to statistically survey the requests for the programs throughout the contracted subscribers having terminal units as well as to provide a complete security system including automatic information and warning for the occurrence of fires, hazards, thefts and other events as well as emergency aids for patients, injuries and other accidents occurring at the premises of each subscriber.

The details for attaining the foregoing various objects of the invention will easily be understood through the descriptions in the introductory part of the present specification outlining the system and in the succeeding detailed description for each of the devices of the system. Other applications obtainable from the present invention and other objects than described above will become apparent referring to the detailed description below.

A CATV system according to the present invention is based upon a two-way communication system and, in particular, mono-cable system. The present invention is to be described at first with the outline of the entire construction thereof and then with the characteristic constructions and functions of individual units and devices.

CONSTRUCTION OF A TWO-WAY CATV SYSTEM

A two-way CATV system of the present invention for attaining the foregoing purposes is described in terms of a preferred embodiment.

Figure 1B:
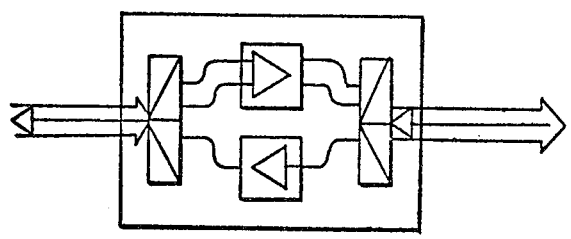
FIG. 1B is a diagram showing the construction of a wired transmission path showing a mono-cable system in a two-way CATV system.
Figure 2:
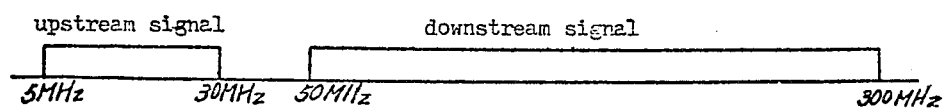
FIG. 2 is a graphical representation of the signal bands used in the wired transmission paths for opposite directions according to a mono-cable system in a two-way CATV system.

Two-way wired transmission paths are generally constituted either as a dual cable system as shown in FIG. 1A or a mono-cable system as shown in FIG. 1B. In the mono-cable system, transmission paths along the direction of distribution (referred to as downstream transmission path hereinafter) and transmission paths along the opposite direction (referred to as upstream hereinafter), that is, to the central control unit (detailed hereinafter) are used in a frequency division manner as shown in FIG. 2, and the amplifiers used therein require such construction as having branching filters for the output and input thereof as shown in FIG. 1B. On the other hand, in a dual cable system shown in FIG. 1A, the amplifier construction can be simplified since different cables are used for downstream and upstream transmissions respectively. The above monocable system and the dual cable system have their advantages and defects respectively as shown in Table 1 and it is required to properly select them in CATV system uses, taking into account the scale of the system, economical construction of the system and the like.

Table 1

| Comparison item | Mono-cable | Dual cable | Remarks |
|---|---|---|---|
| circuit construction | complicated | simple | branching filters are required in the mono-cable system |
| requirements for each portion | severe | less | feed back in filter, delaying characteristics, wide band characteristics in unmatched attenuation amount in the mono-cable system |
| freedom in view of the band utilizability | small | great | restricted by branching filter in the mono-cable system |
| economical merits | advantageous | disadvantageous | comparison between the costs of cable and of the devices |

Generally, it is considered desirable to use a monocable system in the instance in which the amount of information directed upstream is small to allow the use of narrower band therefor, or in the branched line system where less numbers of the cascade-connected amplifiers are used, while it is desired to use a dual cable system where a lot of video information must be transmitted also in the upstream paths, or in the main trunk in which a lot of amplifiers connected in cascade are required because of the great length of a transmission line. In a CATV system according to the present invention, although a mono-cable system is employed, flows of information in two directions are not comparable as in the telephone exchange network and the system is used in a two way manner by uitlizing only a part of the lines of the repeating transmission network for the flow of the information in a counter direction relative to the essentially one way flow of the program information.

For sending upstream signals from individual terminal units to the central control unit, there are considered a frequency band division method, a time division method which sequentially divides the frequency in a narrow band on a time basis and a method of combining the above two methods. For the frequency division method in which a wide frequency band is used for sending upstream information, it is suitable to use the foregoing dual cable system and, in the time sharing method, the mono-cable system can also be used by properly selecting the frequency bands of the upstream and downstream signals so as to use different frequency band areas. Frequency band division utilizing a dual cable system is advantageous since the upstream signals generated from a number of subscribers should be received in a short period of time. The employment of the dual cable system, however, provides a disadvantage in view of the facility cost imposed on each subscriber due to the increased cable cost at the time of providing the apparatus as compared with that required for the time sharing method using mono-cable system as apparent from Table 1. The information content of the upstream signal in the system of the present invention is found to be less than that of the downstream video signals and, therefore, the upstream signal does not always require a wide frequency band. Thus, a time division method using a mono-cable system is employed in the apparatus of this invention for avoiding unnecessary complexity in the apparatus.

Figure 3:
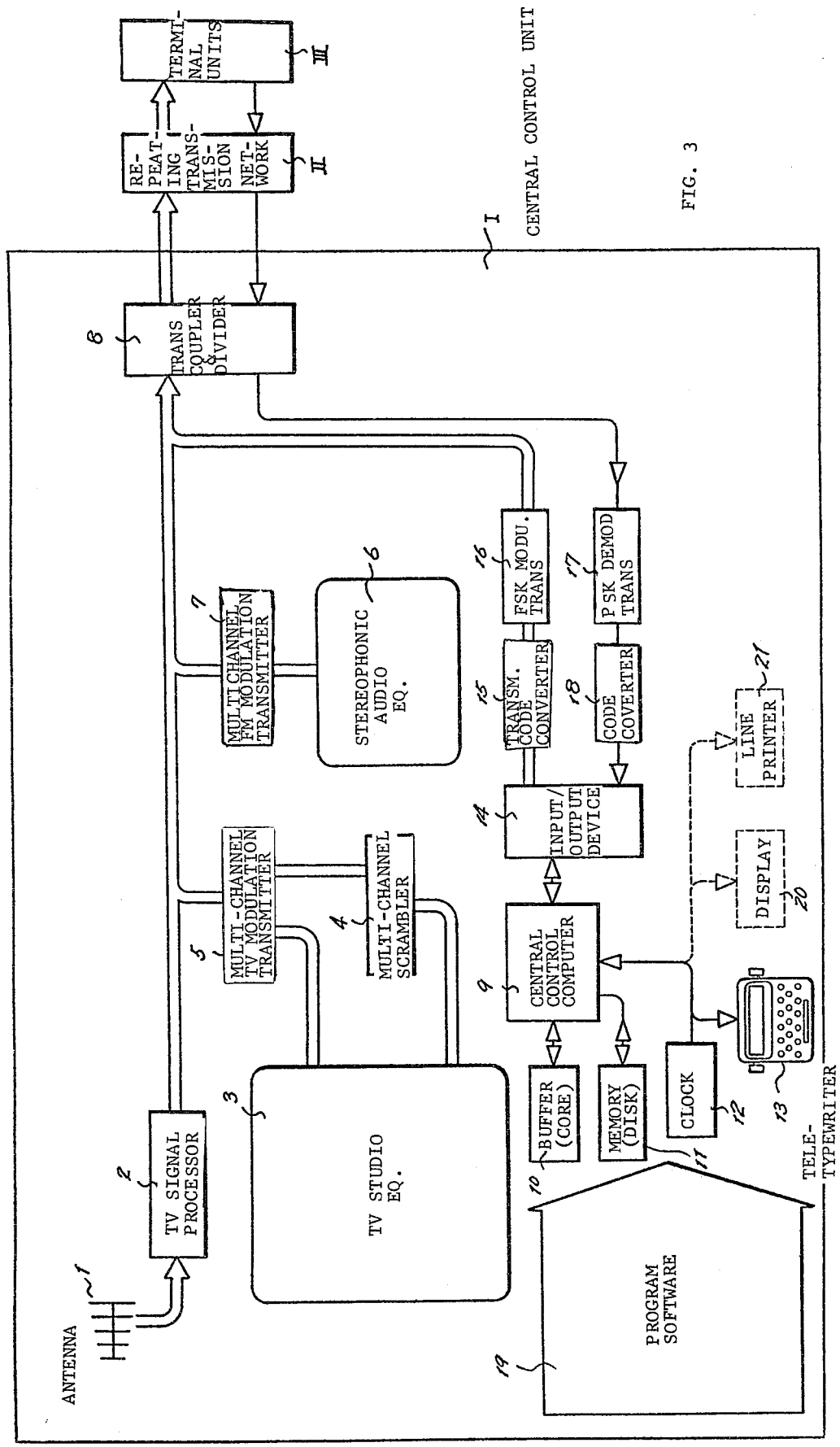
FIG. 3 is a block diagram showing primarily an example of the construction of the central control unit.
Figure 4:
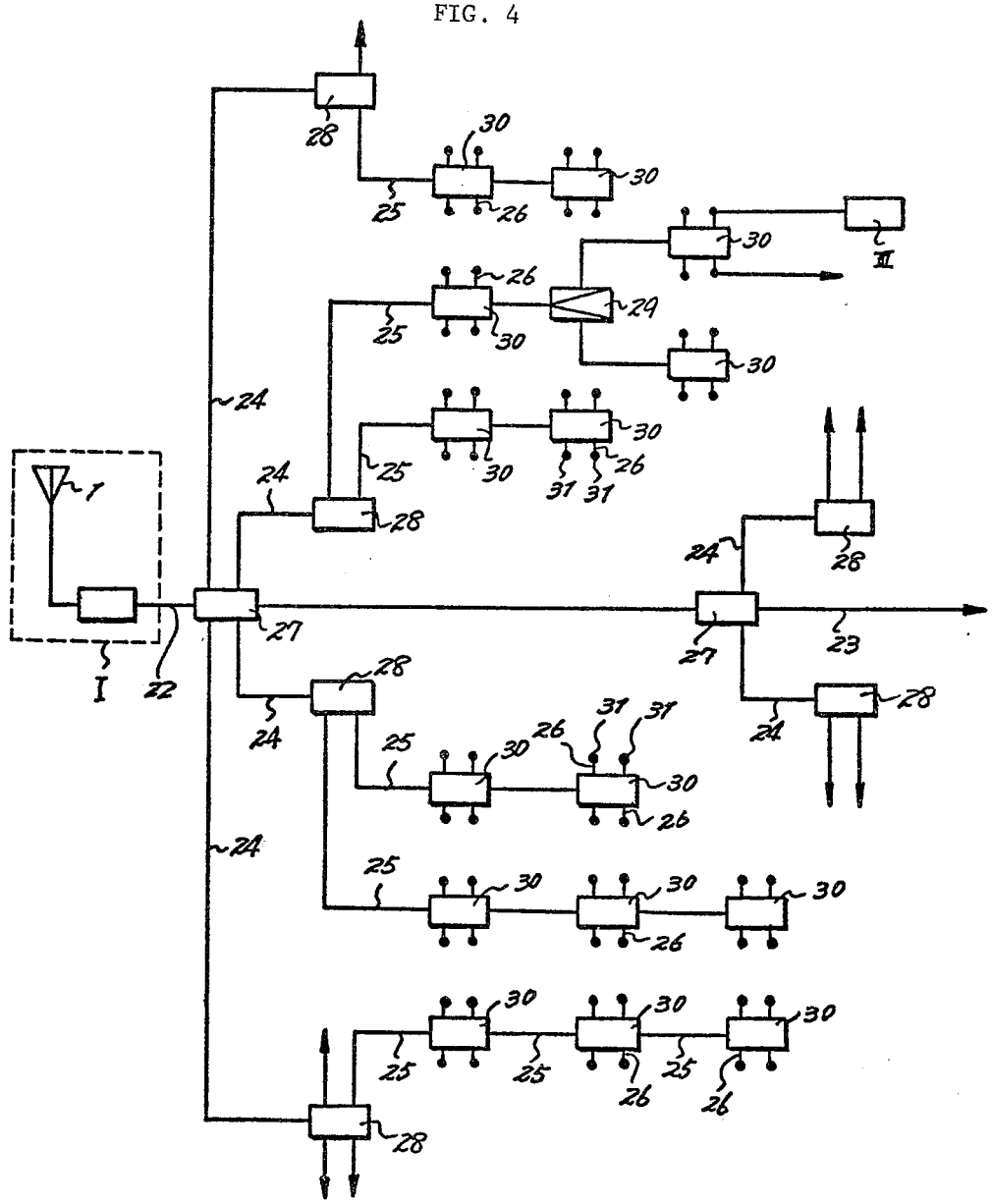
FIG. 4 is a block diagram showing primarily an example of the construction of a repeating transmission network.
Figure 5:
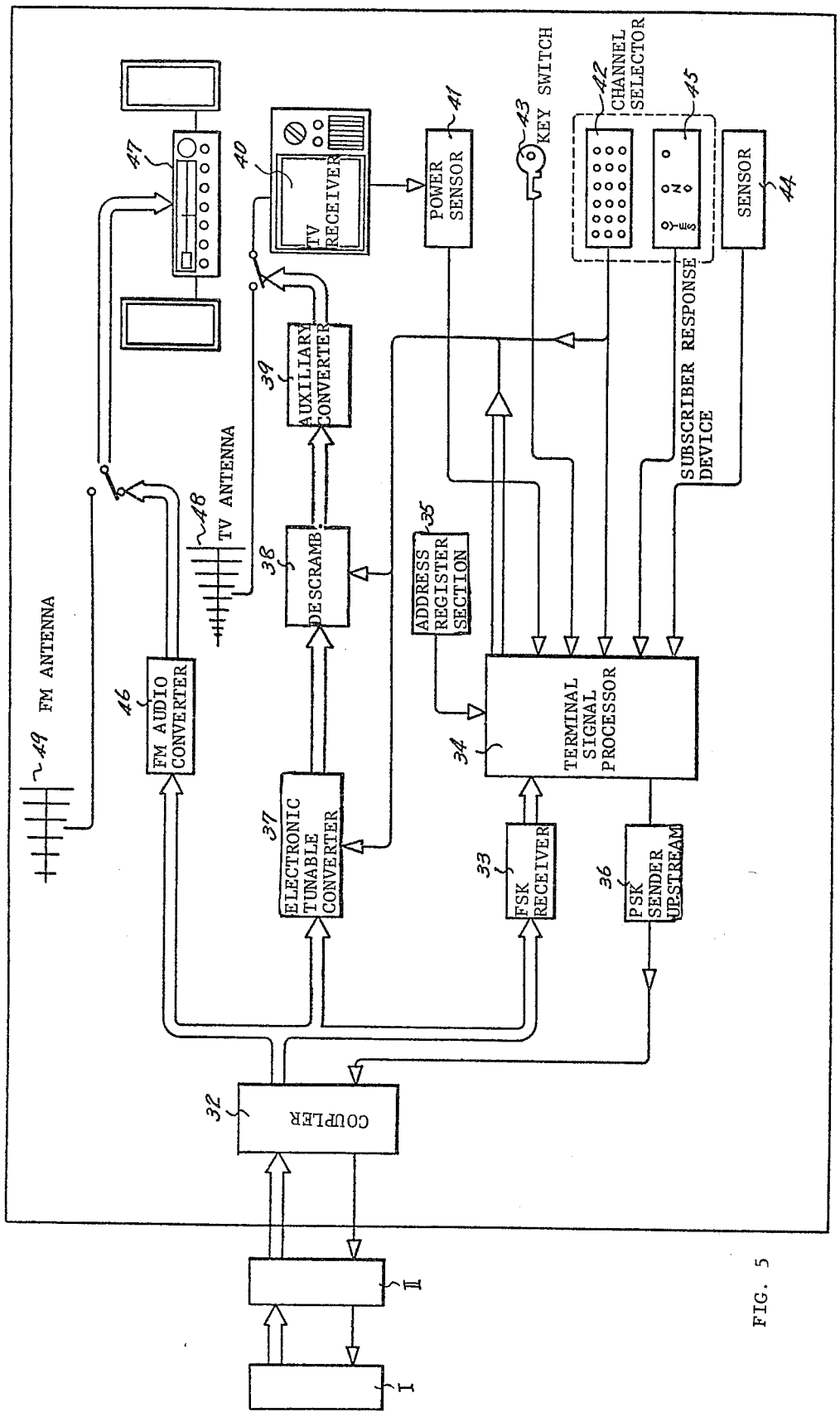
FIG. 5 is a block diagram showing primarily an example of the construction of a terminal unit.

Referring now to the two-way CATV system according to the present invention by way of FIGS. 3, 4 and 5, said system mainly consists of a central control unit I, repeating transmission network II and terminal units III. The central control unit I comprises the following individual devices having the functions set forth below as shown in FIG. 3, wherein reference numerals 1 through 19 denote the following components respectively:

1. antenna
2. TV signal processor
3. TV studio equipment
4. multichannel scrambler
5. multichannel TV modulation transmitter
6. stereophonic audio studio equipment
7. multichannel stereophonic FM modulation transmitter
8. coupling and dividing filter for transmission use
9. central control computer
10. buffer memory (memory core)
11. large capacity memory (memory disk)
12. clock
13. teletypewriter
14. input/output device for communication data
15. transmission code converter
16. frequency shift keying modulation sender (FSK modulation transmitter)
17. phase shift keying demodulation receiver (PSK demodulation receiver)
18. response signal code converter
19. program software for the central control unit The functions and operations of the above set forth devices are to be described successively.

The antenna 1 and the TV signal processor 2 are used for resending, to each of the terminal units, video and FM audio programs by way of the usual aerial radio wave propagation, and they rearrange the frequency bands of the received signals and perform the adjustment and stabilization of the signal levels thereof.

The TV studio equipment 3 and stereophonic audio studio equipment 6 are the apparatus for producing and editing the local programs in order to offer the attractive feature of many programs and they may additionally comprise control devices such as an automatic transmitter and the like.

The multichannel scrambler 4 is provided so that the CATV programs can be received only by a subscriber who pays a subscription fee, because the CATV system is managed on the financial basis of so-called commercial fees paid by the sponsors and service fees paid by the subscribers who utilize the terminal units. In order to attain the above purpose, television signals in the CATV system must be "scrambled" so that they cannot be normally received by usual receivers and this function can be performed by this multichannel scrambler 4. Correspondingly, it is required to provide at the subscribers sites an apparatus for restoring the TV signals thus scrambled and said device is termed a descrambler.

The multichannel video modulation transmitter 5 and the multichannel stereophonic FM modulation transmitter 7 convert the signals of the local programs into those signals suited to the level of the frequency band for use with the CATV system and offer said local programs to each of the subscribers by way of CATV transmission lines.

The coupling and dividing filter 8 for use with transmission is provided for superposing or separating various types of signals transmitted through the transmission cable of the CATV system.

The central control computer 9, buffer memory 10, large capacity memory 11, clock 12 and teletypewriter 13 form a central control section for the data communication and have the function of processing data obtained from each of the subscribers. Based on a preset software program 19, they efficiently perform operations such as communication control between each subscriber, data collection, data summation, billing and the like, the details of which are to be described in the paragraph for the data communication system described hereinafter.

The communication data input/output device 14 interconnects the above-mentioned central control section and each of the terminal units for various types of data communications, assists the central control computer 9 in performing various operations such as data summation, billing and the like between other peripheral units in a parallel manner and temporarily stores data and control signals. As a result, the input/output device 14 controls the input and output of the signals to enable communication with each of the subscribers to be carried out therethrough in a normal procedure with no delay even when several types of operations are performed at the same time in the central control computer 9.

The transmission code converter 15 and the FSK modulation transmitter 16 are apparatus for converting digital coded signals, which are arranged in parallel on a time base generated from the central control computer 9 by way of the communication data input/output unit 14 to give instructions to each of the subscribers, into digital coded signals arranged in series with the time base for transmitting to the CATV transmission lines and for transmitting the converted signals after superposing on them a plurality of sync signals required in the reproduction of said coded signals at each of the terminal units thereby forming frequency shift keying (FSK) signals. Provision of a multiplicity of channels in transmitting and receiving devices for sending parallel data is generally undesired since it complicates the apparatus and increases costs. Therefore, in the present invention, a simple construction is provided by the conversion of parallel coded signals into serial coded signal for data transmission between central control unit I and each of the terminal units III. The formats of the digital signals, although specifically described later are outlined here. Since the signals are converted into serial mode signals, it is required to superpose onto them sync signals indicative of the initiation of the signals to each of the terminal units. Since individual bit pulses are in the form of bi-phase code and a marking or bisecting bit indicative of the beginning of a code frame for each subscriber is added after more than a certain number of space bits for the isolation of said code frame in the present invention, the construction of the apparatus for each of the terminal units and information processing therein can be simplified. This together with FSK modulation of the carrier, contributes to the reduction in the cost of each of the terminal units.

Referring now to the PSK demodulation receiver 17 and the response signal code converter 18, upstream signals automatically sent from each of the subscribers, which are PSK modulated with a similar serial code as in the downstream signals to each of the subscribers as stated before, are received and demodulated and after being converted into the parallel code transmitted as data to the communication data input/output device 14.

The program software 19 for the central control unit I provides programs for performing specific operations in the central control computer 9 which is, for example, a minicomputer for system use in the prsent invention. The software consists of programs containing a series of different operations assembled together that are relevant to this system. In particular for the data communication control, it is suitably combined with processing operations by the hardware in the communication data input/output device. The above relation will be detailed in the section dealing with the data communication system.

Additional devices such as a display device 20 for the indication of the summation results of collected data, a high speed line printer 21 for automatic billing or the like may be provided as shown in FIG. 3 if required and, in this instance, the above said program software 19 necessarily provides programs that contains designations for the operating procedures of these additional devices.

The repeating transmission network II is generally composed of, as shown in FIG. 4, a main trunk 22, trunk 23, branches 24, distribution lines 25 and lead-in wires 26 each of which are to be detailed individually hereinafter.

The main trunk 22 is a basic transmission line to be used for connection between each of the central control units where two or more such units are provided, or connection between the central control unit and the distribution stations where the site for the central control unit and the areas in which the subscribers are located are widely separated. Since it is intended to transmit data for relatively long distances, coaxial cables having low loss are used as the transmission lines and main trunk amplifiers of high performance are utilized.

The trunk 23 constitutes a basic main transmission network in distributing signals from the central control unit to each of the subscribers, and distributing signals to each of the subscribers through a plurality of branches extending therefrom. Accordingly, it is especially important in the main trunk 23 to transmit the signals without deteriorating the signal quality and hence high performance trunk amplifiers 27 are used therein.

The branches 24 are used for supplying the subscribers input signals at a required level while the foregoing trunk 23 has its most important function in the exact transmission of high fidelity signals. The branches 24 hence consist of coaxial cables branched from the trunk amplifiers 27 and branch amplifiers 28 allocated to each subscriber group, and the signals are amplified in the branch amplifiers 28 to a signal level corresponding to that required by each of the subscribers and supplied to the distribution line 25. When a branch 24 becomes longer, an extension amplifier for the repeating amplification is inserted as required. The outputs from the above branch amplifier 28 are divided into a plurality of distribution lines 25 each of which is provided at a suitable interval with branches 29 or distributors 30 for distributing the signals to each of the subscribers. The lead-in wires 26 are a coaxial transmitting path at the terminal that connect the above branches 29 or the distributor 30 with each of the subscribers and at the ends thereof are provided with grounds 31 which protect the system against abnormal voltage such as applied in the case of lightning or the like and also serve as a common voltage reference between the repeating transmission network and the terminal units.

Since a generally available type of repeating transmission network is used in the present invention, the constituting components thereof are illustrated in FIG. 4 only schematically and the more details are not described here.

Referring now to terminal unit III, said terminal units III means apparatus provided at the premises of each subscriber in the system of the present invention and a preferred embodiment thereof consists of the devices described below as shown in FIG. 5, wherein reference numerals 32 through 45 represent the following components respectively:

32. coupler
33. downstream signal receiver (FSK receiver)
34. terminal signal processor
35. address register section
36. upstream signal transmitter (PSK transmitter)
37. electronic tunable converter
38. image control device (descrambler)
39. auxiliary converter
40. TV receiver
41. power sensor
42. channel selector
43. key switch
44. sensor
45. subscriber response device Descriptions are given hereafter for the functions of each of the above components.

A coupler 32 is a device for the combination and separation of the upstream or downstream signals. The downstream signal receiver 33 receives FSK signals for data communication sent from the central control unit I, encodes them and then sends them to the terminal signal processor 34. The terminal signal processor 34 compares the codes of the digital signals received by said downstream signal receiver 33 with the inherent codes previously allocated to each of the subscribers and stored in the address register section 35 and, in response to the contents of the indication signals produced when the two codes coincide, causes the entire terminal unit III to operate as well as control the upstream signal transmitter 36 to transmit signals to the central control unit I with information as to the status of said terminal unit III at that time. The upstream signal transmitter represents, in this case, the conditions in the terminal unit III of the subscriber with a digital code pattern and transmits it after performing PSK modulation with internal timing signals demarcating the upstream signals that are generated from the above terminal signal processor 34. The conditions of the channel being received by a subscriber, the operating status of the key switch 43, conditions in the power sensor 41, information sensed by the sensor 44, the contents of the response due to the manipulation of the subscriber response device 45 and the like are replaced with simple code patterns 5 so that the central control unit I can be informed within the extremely short time period that is allocated to each of the subscribers. The terminal signal processor 34 may be adapted so that a higher preference is given to information that requires earlier transmission and other information of less urgency may be transmitted at the next polling or interrogation.

Further, in order to insure reliable data communication, a device for the detection of data errors may be added and, if desired, the data may be transmitted again.

The electronic tunable converter 37 is a device for receiving broadcasting programs sent via a number of CATV channels and converting them to a specific channel (for example, to channel 2) in the TV receiver 40. This device is operated in electronic tuning fashion by way of the terminal signal processor 34 and the channel selector 42.

The image control device (descrambler) 38 is provided in response to the multichannel scrambler 4 in the central control unit I and functions to restore the TV signals that are scrambled by said scrambler 4.

The auxiliary converter 39 is a device for further converting signals that have been once converted to a specific channel by said electronic tunable converter 37 to other channels. This device is not required unless the particular channel to which signals are converted by the electronic tunable converter 37 is identical to a TV signal channel that is transmitted aerially. If there might be such TV signals in the same channel as broadcast signals that are aerially propagated, then the program signal supplied through the CATV system would be received simultaneously to produce overlapped images and satisfactory service with high image quality could not be expected. Therefore, it becomes necessary in such a case to convert the signals that have been once converted into a particular channel further into another channel, for which purpose the auxiliary converter is provided.

The TV receiver 40 has no particular features characteristic to the present system and any conventional television receiver can be used as such.

A power sensor 41 is provided for the detection of the status in the power supply for the TV receiver 40 above.

The channel selector 42 is a device for tuning the electronic tunable converter 37 to a desired channel and it also functions to inform the terminal signal processor 34 of the status at the selected channel. The key switch 43 constitutes a switch for permitting or inhibiting the reception of pay-TV programs, premium programs requiring higher fees (for instance, special programs such as road shows or the like), restricted premium programs directed to specified subscribers (for example, medical programs for physician, programs for newly developed techniques or the like) and so on. The key switch in use is inserted into a receptacle provided to the casing of the channel selector to operate it and the operation thereof generates an instruction to operate the image control device 38 thereby enabling the above-mentioned programs to be received normally. The sensor represented by reference numeral 44 is a device for detecting the occurrence of fire, theft, hazard and the like as well as requirements for emergency aids or the like to the terminal signal processor 34 through which the above information signals are transmitted to the central control unit I to identify an emergency in the premises of the subscribers.

The subscriber response device 45 is used as a device by which subscribers answer an inquiry issued from the central control unit when a questionnaire procedure such as a public opinion poll is to be effected by utilizing the present system.

In addition, an FM stereophonic audio converter 46 can also be provided and a FM receiver can be used. The channel selector 42, the key switch 43 and the subscriber response device 45 may be assembled in the same control box, or a remote control system can be employed. Reference numeral 48 represents an antenna for the reception of usual TV broadcasting and numeral 49 denotes an antenna for receiving conventional FM broadcasting although they are not always required in the present invention.

DIGITAL SIGNAL SYSTEM FOR DATA COMMUNICATION IN TWO-WAY CATV SYSTEM

Prior to a detailed description of the operation of a two-way system CATV system according to the present invention constructed as above, a description is given of the structure of the code frames and code formats of the signals including the control signals from the central control unit I to each of the terminal units III, the response signals from each of said terminal units III to the central units III to the central control units I and the signals required for denoting present status at each of the terminal units III.

Figure 6A:
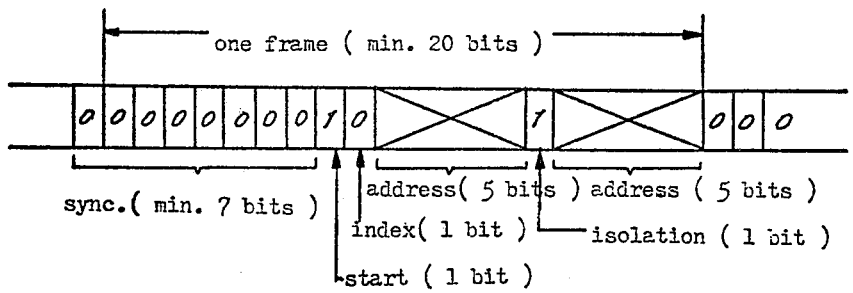
FIG. 6 consisting of FIGS. 6A and 6B comprises an explanatory diagram of the code formats for the signals to be transmitted from the central control unit to the terminal unit and vice versa in the CATV system according to the present invention.
Figure 6B:
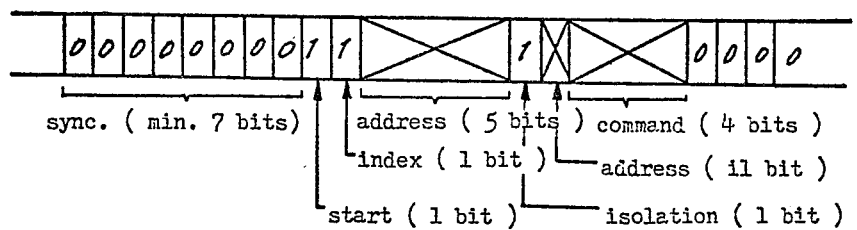

The frame for the downstream signal shown in FIG. 6 consists of 16 address bits, 4 command bits, one index bit for the decision between the group address and the private address, and one isolation or bisecting bit for distinguishing a non-data 0 bit from data 0 bit. The address data are sent out as shown in FIG. 6A divided in 10 group address bits and 6 private address bits and the said 4 command bits are sent out in timing with the delivery of the private address bits shown in FIG. 6B.

The important requirements for the constitution of a frame for use with the transmission of data signals are:

(1) synchronizing signals in the frame can be detected stably, and (2) the frame length should be decreased to as short as possible in order to reduce the individual cycle time for polling (detailed hereinafter).

Referring to (1) above, although synchronization can be effected in a statistical way where the frames are sent out at constant intervals as in PCM communication, other means should be undertaken in other cases capable of uniquely detecting the frame.

The present CATV system can be operated more advantageously with a higher degree of freedom by constituting the frame so that it need not always be sent out at a constant interval.

Figure 7:
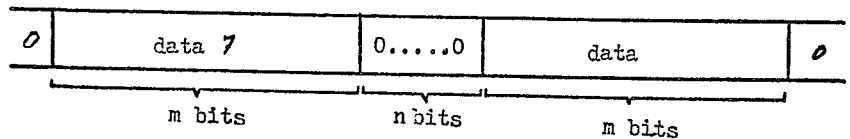
FIGS. 7, 8 and 9 are diagrammatic views showing various types of frame constructions used in the transmission of the data signals.
Figure 8:
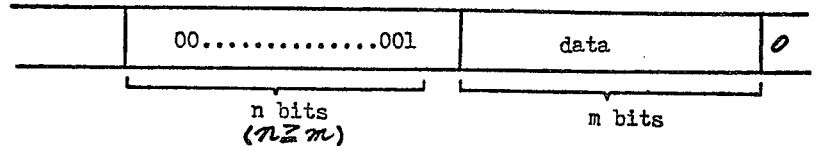

An example of such a technique, in which sync signals are provided with a particular pattern and the possibility of providing the selected bit pattern is positively inhibited from being generated in the data pattern to thereby insure the secured detection of the sync signal is shown in FIG. 7, wherein a series of n 0 bits are employed as sync signals. However, it is required in such a frame construction to prevent the same sequential n bits of 0 for sync signals from being generated in the data signals. Assuming $2^{16}$ numbers of subscribers in a CATV system of this invention, the sequential appearance of n 0 bits in the binary coded bit pattern corresponding to the address cannot be permitted. Although this disadvantage can be overcome by constituting the sync signals with a series of n 0 bits and one 1 bit with the number of n for the 0 bits being greater than that of the data bits (for example, 16 as above) as shown in FIG. 8, this method is wasteful since the frame gets too long and cannot contribute to a reduction in the polling period as required in (2) above.

Figure 9:
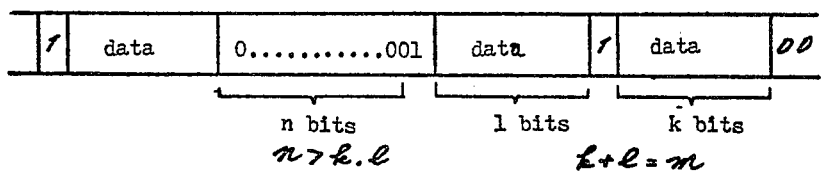

In a system according to the present invention, a code pattern as shown in FIG. 9 is employed as a basic format for satisfying the requirements (1) for the stable synchronization and (2) for minimizing the frame length at the same time. In this method the data sequence is bisected and one 1 bit is interposed therebetween as a bisecting bit. This can decrease the numbers of sequential 0 bits in the data and, therefore, the numbers of 0 bits required in the sync signals. As the result, the frame length can be shortened and the polling period be reduced. When the minimum polling time for one cycle of scanning for all of the subscribers of $2^{16}$ is calculated with the frame construction shown in FIG. 6, for instance, for the bit rate of 500 K bit/sec., it is given as:

$$T_{PTM} = \frac{N_{GMB} \times N_G + N_{PBM} \times N_P}{\text{bit rate}}$$
$$= \frac{20 \times 2^{10} + 20 \times 2^{16}}{500 \times 10^3} = 2.66 \text{ sec.,}$$

wherein $T_{PTM}$=minimum polling time for one cycle of scanning, $N_{GBM}$=minimum bits for the group signals $N_G$=numbers of groups $N_{PBM}$=minimum bits for the private signals $N_P$=numbers of subscribers In the present system a group address is sent once for all subscriber terminals in a group, which terminals include conventional means for recognizing their assigned group address and for deactivation of their associated transmitter when an incorrect group address is received. Alternatively, a command may be sent to turn off all subscribers terminals in a group when they have been polled, until the next correct group address is received.

The requirements for the code format for the downstream signals are set forth as:

(3) easy detection for bit synchronization, (4) requiring only a narrow transmission band, (5) the absence of DC current components, and (6) easy decoding.

Additionally, the following are also required:

(7) transmission in a separate band or transmission by way of the simultaneous modulation of the carrier wave are not performed for timing information, and (8) binary codes are used. The most profitable code format for the operation of the system according to this invention is determined considering the above requirements.

Various types of code formats for digital signal transmission are in general use at present which have been developed and practiced in accordance with their respective applications such as PCM communication, data recording, telemetering and the like. Representations of the above formats are shown in FIG. 10, and their adaptability to the foregoing requirements (3) to (8) are to be discussed for each of them. Regarding the requirement (3), that is, easy detectability of the bit synchronization, RZ code and pulse width code, having line spectrum at the clock frequency when observed in the frequency domain, can easily be detected with the clock frequency and hence the frame synchronization by passing them through a tuning circuit as they are. NRZ code and bi-phase code contain no clock frequency components in their original waveforms. However, the differentiation and full-wave rectification of the NRZ code can produce the clock frequency components and full-wave rectification of the bi-phase code can produce a frequency twice of that of the clock frequency. Although it is considered, in dividing the duplicated clock frequency so as to restore the original clock frequency, that 180° indefiniteness in phase may occur, the demodulation may be easily accomplished by differential type encoding.

Since detection is difficult when 0 bits appear successively in RZ code or when 0 or 1 bits appear successively in NRZ code, some restriction must be imposed to exclude such succession. The pulse width code and bi-phase code have no such defects since they always include timing information in each individual bit.

As to whether the required transmission band is narrow or wide in (4), the power spectrum distribution for each of them must be considered. NRZ code can take the most narrow band, RZ code and bi-phase code require about twice the width of the above band and a pulse width code requires a still wider bandwidth.

Referring to the DC current components required in (5) above, transmission by carrier wave is employed in the system of the present invention and both of the central control unit I and the terminal unit III contain circuits for extracting data from the signal band. Therefore, if there are no DC current components included, AC coupling can be adopted which is preferred because of its stability. All of the RZ code, NRZ code and pulse width code contain DC components and the bi-phase code contains limited DC components. Therefore, by the use of the bi-phase code, information can be transmitted without difficulty even when somewhat lower frequency domains including DC current are excluded.

As to the ease of decoding specified in (6) above, the use of a bi-phase code somewhat complicates the structure in the decoder but shows no significant disadvantages as compared with the decoders using other codes for the signal length of about 16 bits order.

In view of the requirements (7) and (8), any other code formats in FIG. 10 than those set forth above are excluded for the use in the present invention.

It is thus apparent that the bi-phase code can be advantageously used in the system of this invention and, more particularly, bi-phase space code is employed in the present system so that narrower pulses may be produced when the data bits are 0's for enabling more stable detection for the synchronization since sequential 0's are used in detection of frame synchronization and, therefore, the probability of generating 0 is much higher than that of the 1. The only difference between the bi-phase space code and the bi-phase mark code is that 0 in one code corresponds to 1 in another code.

For constituting the frames of upstream signals, the following requirements should further be taken into account:

(9) 6 bits are used as the channel status information for 35 channels,

(10) the bits as defined in (9) above are also used for other responses by adding priority order to each of the responses,

(11) 2 bits are used for the responses to which priority is not attached,

(12) it is impossible to synchronize the data from a number of terminal units III by the use of single clock pulse in the central control unit I because of the differences in the length of the transmission lines of them, although the data from each of the terminal units III are successively transmitted,

(13) even if carrier waves are sent out from each of the terminal units III only at the time of transmitting data and immediately interrupted after the end of the transmission, the outputs after passing through low pass filters (LPF) or bandpass filters (BPF) will continue as the bandwidth is narrower.

(14) some length of time is required in the central control unit I to demodulate the signals at a stable manner from the carrier waves transmitted from each of the terminal units III and, further, to extract therefrom the clock signals,

(15) it is desired, in view of the times required for transmission and reception as well as the polling period, to make the frame for the upstream signals shorter than that for the private signals in the downstream signals,

(16) the code length is required to be varied depending upon the type of modulation and code formats, and

(17) the signals delivered from each of the terminal units III are desirably constituted at first with only the carrier and the bit synchronizing information, and the data are transmitted after the clock signals are stably demodulated and extracted in the central control unit I.

Figure 11:
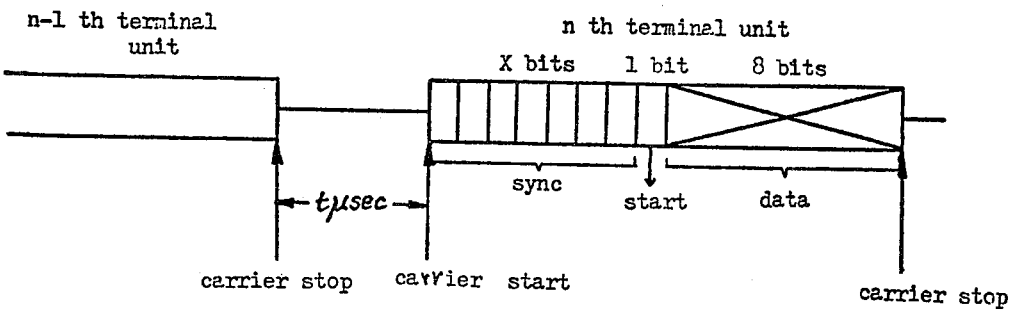
FIG. 11 is a diagrammatic view showing an example of frame construction for the transmission of the data signals used in the present invention.

An example of a signal frame which can satisfy the above requirements and be used in the system of this invention is shown in FIG. 11.

The code formats for the upstream signals are now described. Incorporation of a separate generator in each of the terminal units III as a clock source for the upstream signals is not practical because of the difficulty in equalizing the oscillation frequency of each generator and in view of the increased costs for the terminal units. It has therefore been considered to make use of the downstream signal clocks also for the upstream signals. However, the phase of the signals in each of the transmission lines are quite indefinite due to the differences in the length of their lines and it is difficult to perform data processing synchronization using such signals of indefinite phase. After all, an easier way is to extract the clocks from the data per se. Therefore, a code format in which clock can stably be extracted from the code per se is also desired for the upstream signals as in the downstream signals and, accordingly, almost the same requirements in the selection of the code format of the downstream signals are applicable to those for the upstream signals and the bi-phase space code is selected.

While FSK transmission requires, in principle, two generators having stable oscillation frequencies, PSK transmission requires only one generator. On the other hand FSK reception is easier than PSK reception. In the system of this invention, an FSK receiver is provided for receiving the downstream signals and a PSK transmitter is provided for transmitting the upstream signals in order to simplify the structure of each of the terminal units III and reduce the costs therein. On the other hand, the central control unit I is provided with an FSK transmitter and a PSK receiver but, since they are only required with each one, the cost for the entire system can be reduced remarkably as compared with the contrary case.

THE OPERATION OF A TWO-WAY CATV SYSTEM

Figure 12:
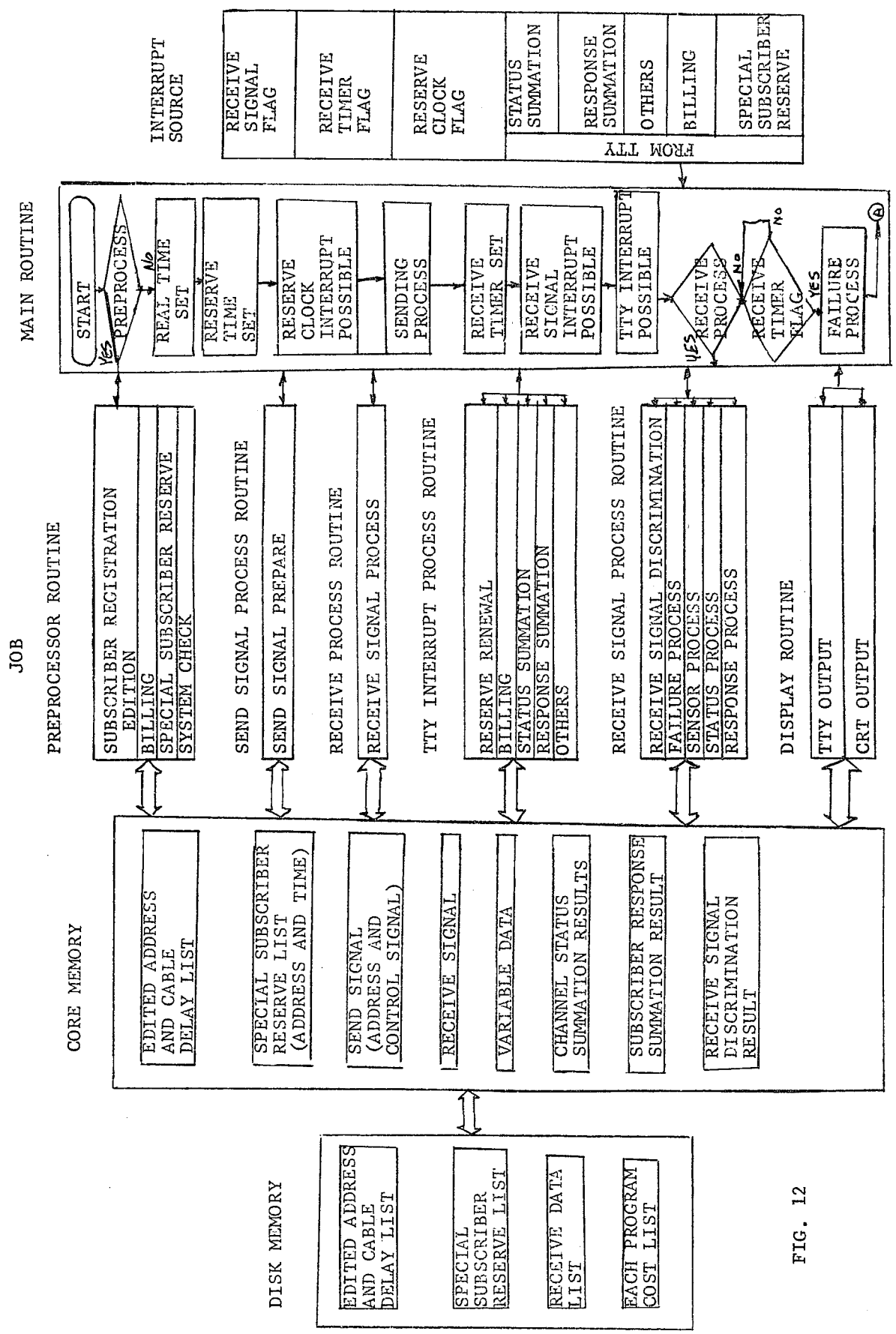
FIG. 12 is a functional block diagram illustrating the contents of various operations to be performed by the central computer.

The operation of a two-way CATV system having the foregoing construction and employing the signal format as above according to the present invention are described referring to FIGS. 3, 5 and 12.

Before conducting actual data communication with each of the terminal units III, pre-edit routine is performed by the computer 9 in the central control unit I based on the control program, wherein the registering and the editing of the subscribers' addresses, listing of each program cost as the basis for billing, reservation of particular subscribers, system checks and the like are performed and the necessary data are stored in the memory core 10 and in the memory disk 11.

In the system of this invention, a subscriber can freely select from an abundant number of programs the desired one without requiring complicated procedures such as reserving individual programs, while a so-called polling operation is performed so that the respective viewing states for the selected program can be checked and the data therefor can be collected automatically in the central control unit I. A predetermined number of channels, typically four or less, is reserved for the restricted premium programs, and these channels are separately controllable at the subscriber's terminals by inhibit commands from the central station. The inhibit command is used to prevent reception on the restricted premium channels, and also functions for the time purpose if a key switch at the terminal is not used by the subscriber to authorize reception of a pay program.

A downstream signal generator provided in the input/output device 14 for the communication data is connected to the computer 9 and delivers an "end of transmission" signal to said computer 9 when the preceding signal transmission to a terminal unit III has been ended. The computer 9, on receiving this "end of transmission" signal, sends out, according to a predetermined program, to the downstream signal generator outputs that contain the address of the next terminal unit III to be controlled and queried as well as the contents of said control and the like in binary parallel digital codes. On completing the outputs, it further delivers the "start of transmission" signal to the downstream signal generator. In response to the above computer outputs, the downstream signal generator outputs parallel digital codes which are converted through a transmission code converter 15 into serial digital codes and then transmitted from the FSK modulation sender 16 to the next terminal unit III.

The signals transmitted from the central control unit I by way of FSK modulation to the terminal unit III are separated from TV video signals in the coupler 32 and fed to the FSK receiver 33 which receives the downstream signals. In the FSK receiver 33, FSK signal waves are amplified in a band limiting manner to remove AM noise through a limiter and then the serial digital codes are demodulated and converted into parallel digital codes and transferred to the terminal signal processor 34. The signals transmitted to the terminal signal processor 34 are extracted therefrom with the sync signals and the system is now prepared for reading the contents of the codes. According to the group address contained in the codes, all of the terminal units belonging to this group address prepare at the same time for the receiving operation in the first step. Then, when a private address is transmitted, only that one terminal unit III having a corresponding address set into its address register 35 completes the preparation for receiving in the second step and receives the control signal transmitted together with said private address to control various functions.

At the same time, the terminal signal processor 34 stores therein in a form of parallel digital code those information to be transmitted to the central control unit I such as from a power sensor 41, channel selector 42, key switch 43, sensor 44, subscriber response device 45 and the like. The key switch 43 must be activated or the terminal signal processor 34 inhibits the reception of scrambled signals. At the same time, the on-off operating status of the TV receiver 40, which must be plugged into the terminal unit, is sensed by the power sensor 41, and unless the usage of power is sensed, reception is also inhibited. Thus, when power is supplied to a TV receiver 40, a subscriber views the channel of the pay-TV broadcasting and the sensor 44 indicates the safe status at his premises, these information are coded into a serial digital code as the downstream signals are transmitted to said terminal unit III and the coded information are transmitted from PSK upstream signal sender 36 to the central control unit I. It is desired to give suitable preference to each of the information inputs, for example, by giving a higher preference for the information for the contents of a subscriber response to that for the channel status, because when a subscriber responds to an inquiry from the central control unit I it is expected that the channel is unchanged. Or, the highest preference may be given to information from the sensor 44 which detects a fire occurrence.

The upstream signals are received and demodulated by the PSK demodulation receiver 17 provided in the central control unit I which comprises a band restricting and limiting amplifier, a phase detector and a generator for a "start of reception" signal, and then fed to a response signal code converter 18 which is instructed to be ready for receiving the upstream signal by said "start of reception" signal. When the serial digital codes are completely read in the response signal code converter 18, the received data in a parallel digital code are delivered therefrom to the computer 9, so that the information from the terminal unit is transmitted together with its inherent address. The computer 9 arranges and processes the information from each of the terminal units III in each of their inherent addresses and sends the data as real time output to the display device 20 to generate a display. Other information are stored together with respective addresses and times concerned in prescribed locations in the memory core 10 and memory disk 11. These stored information are used later as the basis for the accounting fee.

When information for one of the terminal units III has thus been processed, the computer 9 sends an instruction again to the communication data input/output device 14 and repeats the same operation for the next terminal unit III. This operation is continued to perform for all of the succeeding subscriber terminals. The computer 9 monitors change of status, rather than status information, and is not required to supply commands or process significant data as to the great majority of subscribers in a given polling sequence. Thus each polling is completed rapidly and reliable monitoring of subscriber program usage can be effected by successive interrogations.

SCRAMBLER AND DESCRAMBLER SYSTEM

In the two-way CATV system of the present invention, TV signals for many programs are sent from the multichannel TV modulation sender 5 provided in the central control unit I to each of the terminal units III, in which it is required to distinguish pay-TV programs from usual TV programs carried by way of aerially propagated radio waves and re-transmitted from the central control unit I while being only adjusted in signal levels and channel thereof to the system of the present invention.

In order to attain the above purpose, signals in the pay-TV channels are transmitted after having been scrambled by the multichannel scrambler 4 and such scrambled signals are restored to their original form by the operation of the image control device (descrambler) 38 to enable the reception in each of the terminal units III when the subscribers desire to view. Activation of the channel selector 42 to a pay channel is sensed by the central control unit I to enable the automatic calculation for the fees. The details of the operation are to be described below successively.

When a subscriber A wants to receive one of the pay-TV channels, for instance, $P_1$, the power switch of the TV receiver 40 is turned on, the key switch 43 is set to "on" and then the channel selector 42 is set to the channel $P_1$. The information for the performance of the above operation is transmitted to the terminal processor 34 immediately. The computer 9 causes the memory devices, the memory core 10 and memory disk 11, when the terminal of A denotes the reception of channel $P_1$, to store the channel number and the time point as well as the address of the terminal unit I of the subscriber A. In the terminal unit III, scrambled channel signals are restored to the original form by the operation of the image control device 38 to enable the reception of the channel $P_1$. So long as the information for the status of the terminal unit III of the subscriber A remains unchanged, the computer 9 does not write into the storage devices, the memory core 10 and memory disk 11. When the subscriber A switches his pay-TV channel from $P_1$ to $P_n$, the computer 9 stores the information for the end of the reception of channel $P_1$ and the information for the start of the reception of channel $P_n$ as well as the address of the subscriber and the relevant time in the memory core 10 and memory disk 11 as storage devices. Thereafter, when the subscriber turns the power switch of his TV receiver 40 to off, puts the key switch 43 to off or changes the selector to a non pay-TV channel, the image control device 38 is put to "off" to make the pay-TV channel unreceivable unless the key switch 43 is turned to "on" again. The information of this new status is transmitted to the central control unit I and stored in the memory core 10 and memory disk 11 storage devices.

REFRESH TYPE AUTOMATIC RECEIVING SYSTEM FOR PARTICULAR CHANNEL

The system of the present invention is adapted so that a particular "turn on" channel can automatically be received when the power supply for the TV receiver 40 is recovered after once disconnected, irrespective of the channel that was received before, and the program of such particular "turn on" channel contains public news, program introduction, and the like. The channel selector 42 is basically composed of n units of DC voltage generators which can be externally selected by a manual switch, together with a particular DC voltage setter for receiving the "turn on" channel and a switch and it is connected to the electronic tunable converter 37 and to the terminal signal processor 34. As described before, when the power supply is once disconnected, the power sensor 41 gives an instruction to the terminal signal processor 34 to cause the switch to select the DC voltage for the "turn on" channel and apply it to the electronic tunable converter 37. If a subscriber desires to view a program other than the "turn on" channel from the beginning of his next reception, he can do so by performing the selection with the above manual switch and then turning the power switch to "on", whereby one of the n units of DC voltage generators is selected and the voltage information is applied to the electronic tunable converter 37 and also to the terminal signal processor 34.

SUBSCRIBER RESPONSE SYSTEM AND VARIOUS ALARM SYSTEMS

Descriptions will be given for the methods of sending out inquiries and performing a public opinion poll by utilizing the subscriber response device 45 and for the operation of the alarm system by means of various sensors.

In sending out inquiries and the like, items for the questions are sent out to the subscribers by way of the TV transmitter. The subscribers, on examining the contents of the questions, select one of the answers of three types such as, for example, yes, no and maybe and push the corresponding buttons provided in the subscriber response device 45. This response is sent to the terminal signal processor 34 and held therein for a period of time longer than one cycle of polling and shorter than two cycles of polling for the entire system. The contents held are sent to the computer 9 in the central control unit I when each of the terminal units III attends to the polling for the first time after the response of the subscriber, and the computer 9 collects and processes each of the answers to store them into the memory core 10 and memory disk 11 as storage devices as well as outputs the contents thereof if required to the display device 20 for an indication. The display is performed as the result of the summation, for example, on the screens of the TV set.

The priority for the information from the subscriber response device 45 is set higher than that for the channel status information but lower than that for the "off" information of the power switch of the TV receiver.

Since various sensors 44 such as for fire, theft, panic and the like are provided at suitable locations on the subscribers' premises and all of them are connected to the terminal signal processor 34 in the terminal units III, if one of the sensors operates, the information is immediately sent to the terminal signal processor 34 and communicated therefrom to the central control unit I when the terminal unit III concerned attends to the polling. The central control unit I monitors all of the subscribers' premises collectively and, when abnormal conditions are sensed, generates alarms by means of a bell, lamp and the like and also causes the display device 20 to indicate the address of the subscriber to which the terminal unit III is provided and the contents of alarms. The priority for alarm information is set above that for the "off" information from the power switch of the TV receiver, and proper priority order may be established among the alarm information as required.

The outlined descriptions have been made for the constitution of the two-way CATV system according to the present invention, digital signal formats in the data communication therefor and the manner of its operation. Now, the constitution in each of the blocks characteristic to the present invention will be detailed. Prior to this detailed description, however, the advantageous effects of the present invention that are apparent from the foregoing explanation are set forth.

(a) Since the provision of a control computer 9 in the central control unit I enables polling throughout the entire system in a short period to perform real time control, viewing fees can be calculated on every program. Moreover since this accounting can be performed automatically, only a few operators are necessary for the system operation. Further, the subscribers can freely select such programs as they desire and the viewing time and frequency can be grasped exactly in what may be called a receiving percentage by way of the reception monitoring in the central control unit I, as the result of which editing can easily provide more varied and attractive programs.

(b) Inquiries can be responded to in real time by the use of the subscriber response device 45.

(c) Reception of a pay-TV or premium program can surely be monitored by the provision of the centralized control type scrambler 4 and descrambler 38 as well as the key switch 43.

(d) Provision of the FSK modulation transmitter 16 and the PSK demodulation receiver 17 in the central control unit I and the FSK downstream signal receiver 33 and the PSK upstream signal transmitter 36 in each of the terminal units III for use in data communication enables reliable communication of various data and simplified construction of the terminal units III to lessen the installation cost burden on the subscriber.

(e) Local public news and advance announcements for the programs can be broadcast irrespective of each program by way of the refresh type automatic receiving system for a particular channel.

(f) Emergencies such as fire, theft or the like can be sensed rapidly by way of the sensors 44 and the damages caused thereby can be minimized. Priority order can properly be given among these information or between them and the channel information, and these information can be sent to the central control unit I which, in turn, causes the display device 20 to indicate them or inform them by way of television screens to the subscribers.

The detailed descriptions of arrangements characteristic to this invention will be made for each of the blocks.

MULTICHANNEL SCRAMBLER

This is a preferred embodiment of the scrambler 4 in the central control unit I for amplitude modulating the radio frequency television composite signals (designated hereinafter merely as RF-TV composite signals) with certain modulation signals in order to control the sync signal level of said composite signals below the peak level of the video signals. This image control method is referred to as a gray-sync method.

Figure 13:
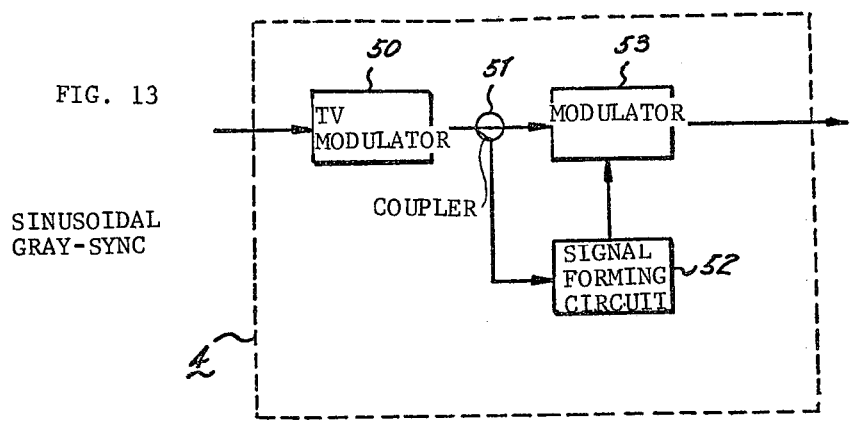
FIG. 13 shows one example of a scrambler used in the central control unit.

This invention is to be described by way of its preferred embodiment referring to FIG. 13, wherein reference numeral 50 denotes a repeating amplifier (TV modulator) for amplifying the RF-TV composite signals and the output thereof is connected with a coupler 51 which branches the RF-TV composite signals. An output end of the coupler 51 is connected with a scramble signal forming circuit 52 which provides sinusoidal waves synchronous with the horizontal sync signals in the RF-TV composite signals. Circuit connections are so made that a modulator 53 receives the RF-TV composite signals obtained from the other output of the coupler 51 as a carrier and with the modulation signal outputs from the modulation signal forming circuit 52 as a modulation wave.

The operation of the present scrambling device thus constructed is explained below.

Figure 14:
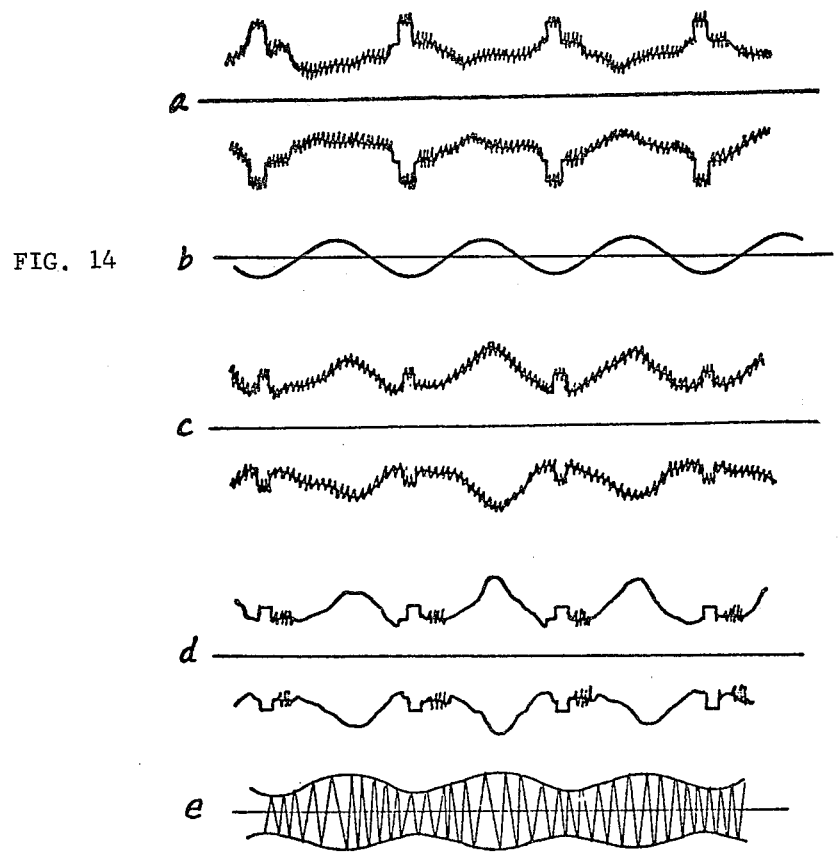
FIG. 14 is a chart of waveforms illustrating the changes in the signals in the example shown in FIG. 13.

In FIG. 14, letter a shows the RF-TV composite signals before application to the repeating amplifier 50 and they are branched after being amplified in said repeating amplifier 50 through the coupler 51. One of the branched portions of the RF-TV composite signal is applied to the modulation signal forming circuit 52. This circuit 52 detects the horizontal signals in the video signals and forms sinusoidal waves (modulation signals) synchronous with said horizontal sync signals. Letter b represents the sinusoidal waves obtained from the foregoing modulation signal forming circuit 52. The other of the branched portions of the RF-TV composite signals obtained through the coupler 51 is applied to the modulator 53 and subjected to amplitude modulation therein by way of the sinusoidal waves (modulation signals). Therefore, audio FM signals contained in the RF-TV composite signals also undergo AM modulation. Thus, scrambled RF-TV composite signals are obtained at the output of the modulator 53. Letter c represents the foregoing scrambled RF-TV composite signals, d represents scrambled video signals in the RF-TV composite signals represented in c and e represents modulation signals amplitude modulated on the audio FM signals in the RF-TV composite signals represented in c.

As described above, since the scrambling device for use with this invention comprises the modulation signal forming circuit 52 which produces sinusoidal waves from RF-TV composite signals synchronous with the horizontal video sync signals therein and the modulator 53 which AM modulates said RF-TV composite signals with said sinusoidal waves, a modulator for superposing demodulating signals usually necessary for the demodulation is not required and, therefore, gray-sync signals can easily be obtained only by providing a simple and low cost adapter with no modifications to the existing central control equipment for RF modulation. Moreover, the difference in levels between the video signals and the audio signals in the same channel is always constant despite the addition of this modulator. Further, since image control can be performed with the scrambled signals thus obtained at the RF stage in the terminal unit III, the AM components superposed over the audio FM signals have no effects on the TV receiver. In other words, buzz tones and audio beats caused by the overlapping of demodulating signals required for the demodulation can be suppressed.

The above described gray-sync method can be classified further into several ways.

COMMUNICATION DATA INPUT/OUTPUT DEVICE 14, TRANSMISSION CODE CONVERTER 15 AND RESPONSE SIGNAL CODE CONVERTER 18

These devices comprise a section for processing downstream signals which functions to receive the address of each of the subscribers successively delivered from the computer 9 and convert the same into a predetermined pattern of bi-phase space code signals to send out via the FSK modulation transmitter 16, and another section having the function of reading the data in the upstream signals sent from each of the terminal units and received by the PSK demodulation receiver 17 and transmitting them to the computer 9. Also included in these devices are a timer for the detection of errors which are produced in case the signals cannot be returned due to failure in the terminal units III, repeating transmission network II or the like.

Prior to a detailed description of the specific construction and functions of these devices, the formats of the signals sent and received between these devices are to be explained.

All signal transmission and reception between the computer 9 and these devices are carried out by means of negative logic in parallel codes. 11 bits of data signal and 3 bits of input control signal are delivered from the computer 9 to the input/output device 14 for the communication data, while 8 bits of data signal and 4 bits of interruption output signal are delivered to the computer 9. The 11 bits of data input signal can either be a group signal or a private signal with a "0" bit corresponding to the group signal and a "1" bit to the private signal. Referring to the remaining 10 bits, all of the bits constitute the address data in the group signal, and 6 bits represent addresses and 4 bits form commands for the control of the terminal units in the private signal.

An example of the above data pattern has been shown in FIG. 6. The output signal of 8 bits data are those returned from each of the terminal units III to the computer 9, and all of said 8 bits are the status information representing the states for the channel selector 42, subscriber response device 45 and the like in the terminal units III.

The input control signal comprises three types of signals. The first type is a "start of transmission" signal (referred to merely as SOT hereinafter), which is an instruction signal delivered simultaneously with the output of the above described 11 bits of data input signal from the computer 9 and initiates reception of said data and transfer to the repeating transmission network II. The second type is a "start of failure timer-2" signal (referred to simply as SOFT-2 hereinafter), which is output simultaneously with the output of the private signal and initiates the start of a failure timer. The third type is a "start of transmission timer" signal (referred to simply as SOTT hereinafter), which initiates the start of a transmission timer.

References are to be made on the interrupt output signal which comprises four types of signals. The first type is referred to as an "end of transmission" signal (referred to simply hereinafter as EOT), which indicates that the aforementioned 11 bit data input signals output from said computer 9 have been sent to the end in a prescribed pattern. The second type is referred to as a "received data present" signal (referred to simply as RDP hereinafter), which is a signal for informing the computer 9 that data from a terminal unit III are being received and the aforedescribed 8 bit data output signals are being delivered and which instructs the computer 9 to receive the signals. The third type is referred to as a "failure interrupt" signal (referred to simply as FINT hereinafter), which informs computer 9 of generation of error when there are no return signals coming from the terminal units III after a predetermined period has elapsed since the sending out of the data. The fourth type is referred to as a "time interrupt" signal (referred to simply as TINT hereinafter), which is a synchronizing signal appearing at a certain time interval that is used in the overlapping transmission (multiplex transmission).

Figure 15:
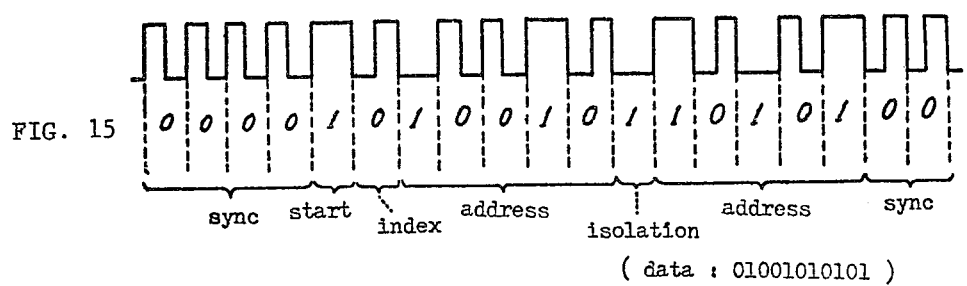
FIG. 15 is a graphical waveform representation showing a signal pattern to be delivered from a communication data input/output device to a frequency shift keying modulation sender.

Signals from the input/output device 14 for data communication to the FSK modulation sender 16 are delivered after conversion of the parallel data given by the computer 9 into a predetermined pattern of serial bi-phase space code in the transmit code converter 15. One example of the pattern is illustrated in FIG. 15.

Figure 16:
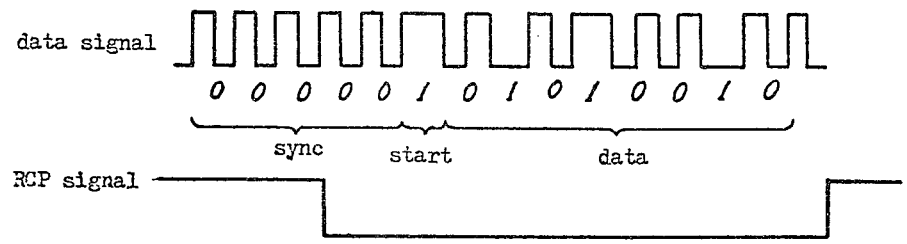
FIG. 16 is a graphical waveform representation showing a signal pattern to be delivered from a phase shift keying demodulation receiver to a response signal code converter.

The signals sent from the PSK demodulation receiver 17 to the response signal code converter 18 comprises two types, the first type being unshaped data of the bi-phase space code demodulated through the PSK demodulation receiver 17 and the second type being a "received carrier present" signal (referred to simply as RCP hereinafter) which designates the arrival of signals from the terminal units III. The signal pattern is illustrated in FIG. 16.

Those signals described above are used for the transmission and reception of data between each of the three devices, and between these devices and external units.

The arrangements of the three devices are to be described below.

Figure 17:
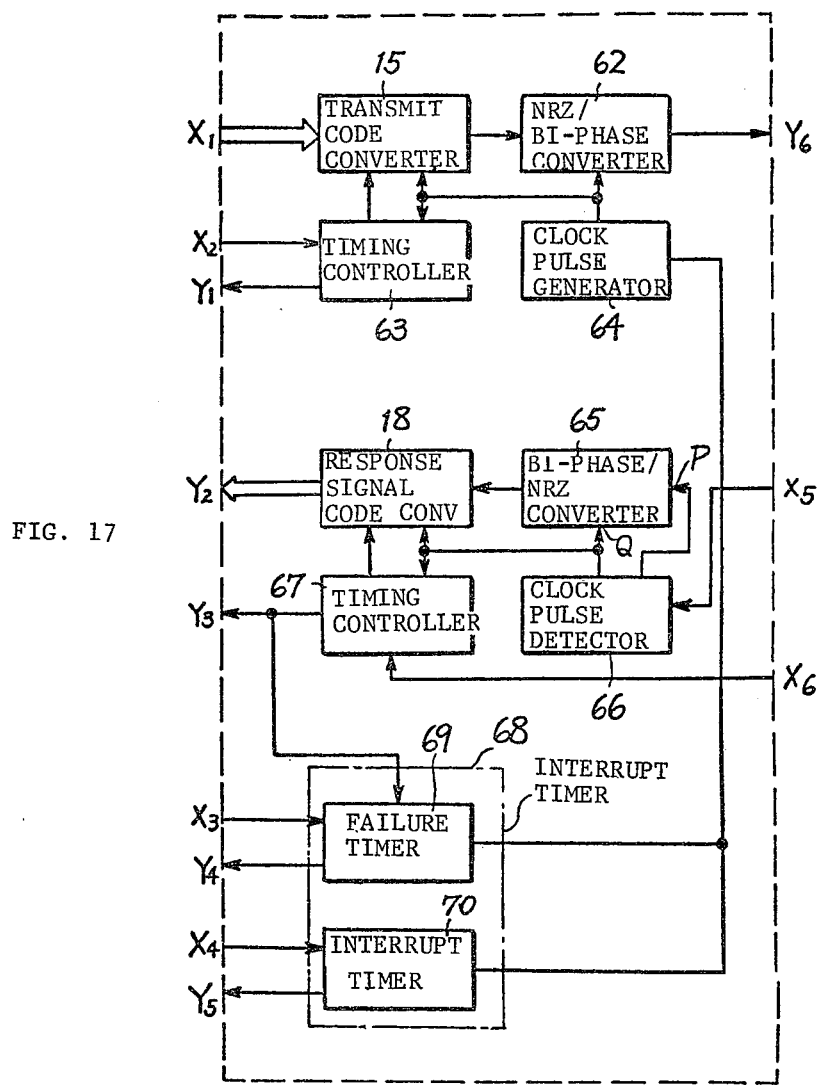
FIG. 17 is a block diagram primarily showing the construction of an input/output device for data communication.

FIG. 17 shows a generalized block diagram of them, wherein $X_1$ represents an input terminal for parallel data sent from the computer 9, $X_2$, $X_3$ and $X_4$ are input terminals for receiving the above-mentioned control signals SOT, RDP, SOFT-2 and SOTT respectively, and $X_5$ is an input terminal for biphase data delivered from the PSK demodulation receiver 17. $Y_2$ denotes an output terminal for parallel data sent out from the input/output device 14 as communication data to the computer 9, and $Y_1$, $Y_3$, $Y_4$ and $Y_5$ are output terminals respectively for each of the control signals of EOT, RDP, FINT and TINT which are sent from the input/output device 14 for data communication with the computer 9. $Y_6$ is an output terminal carrying biphase data sent out from the transmission code converter 15 to the FSK modulation sender 16.

Description is now to be made for each of the blocks in FIG. 17, wherein reference numeral 15 denotes a transmit code converter for converting parallel data into serial data, numeral 62 denotes a NRZ/bi-phase converter for converting the signals, which are converted in said converter 15 into NRZ code, further into the bi-phase code and numeral 63 represents a timing controller. Reference numeral 64 is a clock pulse generator for the generation of clock pulses to be delivered to each of the function blocks, numeral 18 is a response signal code converter and numeral 65 represents a bi-phase/NRZ converter for converting bi-phase data sent from the PSK modulation receiver 17 into NRZ code. Numeral 66 represents a clock pulse detector for detecting the clock pulse in the bi-phase data delivered from the terminal X$_5$, and for sending shaped bi-phase signal outputs to the terminal p of the bi-phase/NRZ converter 65 on one hand, and sending clock pulse signals to the response signal code converter 18, the terminal Q of the bi-phase/NRZ converter 65 and to a timing controller represented by numeral 67. An interrupt timer 68 is shown to comprise a failure timer 69 for the error detection and a transmission timer 70. All of the above components 62 through 70 constitute the input/output device 14 for communication data.

The following description of the functions of these devices is based on the foregoing construction.

1 MHz clock pulses are generated in the clock pulse generator 64 by means of a quartz oscillator, divided in frequency to 500 KHz and then delivered to each component in the circuits, that is, to transmit code converter 15, NRZ/biphase converter 62, timing controller 63, failure timer 69 and transmission timer 70. When the data are delivered in parallel form from the computer 9 to the transmit code converter 15, there is also sent simultaneously from the computer 9 to the timing controller 63 the SOT signal which controls the input data to be delivered to the shift register in the transmit code converter 15 in parallel manner (start bit and isolation bit not contained in the input data are also added as input) and then they are sent out in series under the control of the clock signals. When 20 bits in total have been sent out with one bit of "0" added before the start bit and 6 bits of "0" added after the end of 13 data bits, the EOT signal is delivered from the timing controller 63 to the computer 9 to put the system in a status waiting for the next SOT signal. Meanwhile, the output terminal Y$_6$ of the NRZ/bi-phase converter 62 always delivers logic "0". The data converted into NRZ code through the transmit converter 15 are further converted from said NRZ code into the bi-phase code through the NRZ/bi-phase code converter and then sent out to the FSK modulator 16, which operates in the manner described below. In FIG. 18, A is $\overline{NRZ}$ signal, B is clock pulse signal cp and C is inverted clock pulse signal $\overline{cp}$. By the adaptation of a J-K flip-flop to take logic value "1" when the $\overline{NRZ}$ signal is in the logic value "0" and to reverse its status when the $\overline{NRZ}$ signals is in logic value "1" in synchronism with the fall of the inverted clock pulse $\overline{cp}$ shown in (C), the signals Q$_1$ shown in (D) is obtained. In a similar manner, by the adoption of a J-K flip-flop to take logic value "1" when the $\overline{NRZ}$ signals is in the logic value "0" and to reverse its status when the $\overline{NRZ}$ signal is in logic value "1" in synchronism with the fall of the clock pulse $\overline{cp}$ shown in (B), the signal Q$_2$ is obtained as shown in (E). The signals $\overline{Q_1}$ and $\overline{Q_2}$ can be formed to the signals shown in (G) and (F) respectively and the signals shown in (H) and (I) can be obtained respectively by performing logic operation of $\overline{Q_1} \cdot \overline{Q_2}$ and $\overline{Q_1} \cdot Q_2$ through a gate. The signals shown (H) and (F) can further input to a NAND gate to form signals shown (J) shown by the following logic equation:

$$\overline{Q_1 \cdot Q_2 \cdot \overline{Q_1} \cdot \overline{Q_2}} = \overline{(\overline{Q_1} + \overline{Q_2}) \cdot (Q_1 + Q_2)}$$

that is, the bi-phase signal.

It should be noted that the interrupt timer 68 comprises a transmission timer 70 and a failure timer 69. The transmission timer 70 starts its counting operation at the arrival of the SOTT signal and ouputs a 2 μsec width pulse in a predetermined time interval. The failure timer 69 is adapted so that two types of operations can be selected by a turn over switch. One of the operations is for overlapping transmission, wherein the timer delivers no output when the RDP signal, which indicates the return of the data from the terminal unit III, appears in a predetermined time interval, but alternatively delivers an output pulse of 2 μsec width when the next RDP signal does not appear after said predetermined time interval has elapsed since the preceding RDP signal. In view of the circuit arrangement, this function is performed by resetting the timer on every arrival of the RDP signal to thereby start the counting operation from zero and causing the timer to overflow and deliver an output if not reset within a predetermined time. The other operation is for sequential transmission, wherein the timer starts to perform the counting operation on the arrival of the SOFT signal and is reset and stopped on the arrival of the RDP signal. When there is no RDP signal, the timer overflows to deliver a pulse output of 2 μsec width.

Both the transmission timer 70 and the failure timer 69 employ binary preset counters as timers and time setting is performed with 8 bit binary codes. Clock pulses of 2 μsec width are used for the time base and the time can be set at 2 μsec interval.

The clock pulse detector 66 comprises a section for detecting the clock pulse from the data in the form of bi-phase space code patterns that are sent from the PSK demodulation receiver 17 and another section for shaping the waveform, the block diagram of which is shown in FIG. 19. The signals of the bi-phase space code are prepared, as described before, by switching function from two signal waves of the same frequency and in the opposed phases. When the bi-phase code data are delivered at random, the clock frequency contains no line spectrum but when this bi-phase code signal is subjected to full-wave rectification, the line spectrum appears at the doubled frequency. Therefore, as shown in FIG. 19, the bi-phase space code signal inputs are amplified in an amplifier 71 to a required voltage level, subjected to full-wave rectification in a full-wave rectifier 72 and extracted with the components having a frequency twice as high as that of the clock pulse in the tank circuit 74. The extracted components are shaped with their waveform in a level converter 75 and then formed into clock pulses in a ½ divider 76. Since the clock undergoes frequency division, it has 180° ambiguity in phase but demodulation can be effected in the bi-phase space code irrespective of such ambiguity, thus avoiding difficulties. The bi-phase space code signals sent from the PSK demodulation receiver 17 are, after amplification in the amplifier 71, subjected to waveshaping in the level converter 73 to produce bi-phase space code signals. The clock pulses obtained here are delivered to each of the circuit components, the response signal code converter 18, bi-phase/NRZ converter 65 and timing controller 67. When the bi-phase space code data are delivered from the PSK demodulation receiver 17 through the input terminal X$_5$ to the bi-phase/NRZ converter 65, the RCP signal indicative of the arrival of the signal on the timing controller 67 from the terminal is input simultaneously. In the bi-phase/NRZ converter 65, bi-phase space code signals are converted into the NRZ signals inversely to the manner in the NRZ/bi-phase converter 62 and said NRZ signals are serially input under the control of the RCP signal to the response signal code converter 18. When all of the input signals are accepted, they are read in the latch on the response signal code converter 18 whereby the RDP signal, indicative of the reception of the data from the terminal units III and the sending of the 8 bit data output signals, is sent from the timing controller 67 to the computer 9. Based on the foregoing functions, these devices transmit and receive the signals between the computer 9 and the FSK modulation sender 16 as well as between the computer 9 and the PSK demodulation receiver 17.

UPSTREAM SIGNAL SENDER

Figure 20:
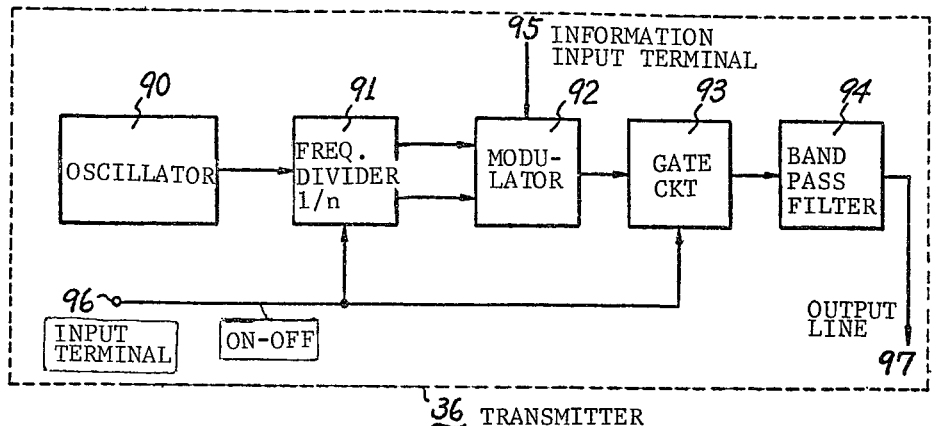
FIG. 20 is a block diagram showing the construction of the upstream signal sender.

This device concerns a transmitter 36 provided in the terminal unit III of a system which transmits the information in each of the terminal units III from said units to the central control unit I on the same frequency in a time sharing manner. The device is to be described by way of a preferred embodiment referring to FIG. 20, wherein reference numeral 90 represents an oscillator provided in the first stage of the present transmitter 36 for generating the upstream signal carrier and numeral 91 denotes a frequency divider which divides the frequency $f_0$ from said oscillator 90 into $1/n$ fractions and has an input terminal for on-off commands for transmission. Reference numeral 92 represents a modulator for modulating the two carriers, which are delivered from the divider 91 and differ in phase by 180° from each other, by way of the information signals applied to an information input terminal 95 of the terminal unit III, and the numeral 93 represents a gate circuit controlled by the instruction accepted through the input terminal 96 for on-off commands for the transmission. The gate circuit 93 is connected at its output end with a bandpass filter 94 which allows, of the transmission signals delivered from said circuit 93, only the frequency to be used in the system to pass therethrough, and the other end of the bandpass filter 94 is connected with an output line 97.

According to the above construction, the oscillator 90 can always be kept in its oscillating condition and, when the SOT signal is sent to the input terminal 96 for an on-off command for transmission, divider 91 starts its frequency division operation and, simultaneously, the gate circuit 93 opens to thereby initiate the operation of the present transmitter 36. Referring to the operation of each of the components of this transmitter, the frequency divider 91 divides the frequency of the oscillated output into $1/n$ fractions to provide at the output thereof two carriers different from each other in the phase by 180°, which are applied to the modulator 92. Since the two carriers are modulated with the information from the terminal unit III (converted from parallel into serial code) to form PSK (phase shift keying) signals, they are passed through the gate circuit 93 and the bandpass filter 94 and then led to the output line 97. The information in the terminal unit III is thus transmitted to the central control unit I.

When the stop of transmission signal is delivered to the input terminal 96 for transmission of an on-off command, the frequency division operation of the divider 91 is stopped and the gate of the gate circuit 93 is also closed to thereby stop the operation of the transmitter 36. Referring to the operation of each of the components of the transmitter 36, the frequency divider 91 does not operate but stops its frequency division. In addition, since the carriers are not delivered to the input of the modulator 92, PSK signals are not delivered. Since the gate of the gate circuit 93 is closed due to the application of the stop of transmission signal, neither signals nor noise are produced at the output of said gate circuit 93.

As explained above, since the oscillator 90 in the upstream transmitter 36 in this invention is always kept in the oscillating condition, various advantages are obtainable as compared with the conventional transmitters where an oscillator is subjected to the direct keying operation, such as no time lags caused by the starting and stopping of the oscillator, stability in the oscillation frequency, no carrier leaks from the oscillator at the time of interruption of transmission, no interference from the oscillator 90 due to the difference of the frequencies between the oscillation output and the carrier, more simple construction of the circuits and the like.

ELECTRONIC TUNABLE CONVERTER

Figure 21:
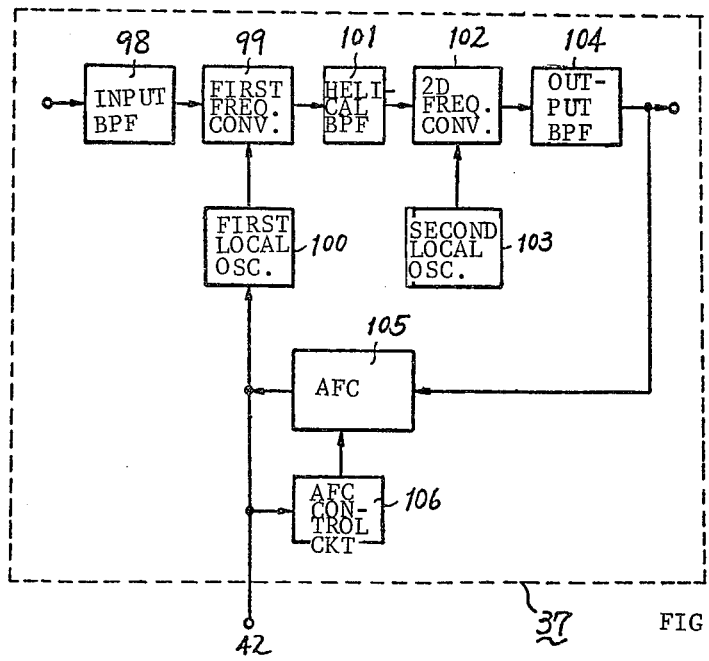
FIG. 21 is a block diagram showing the construction of an electronic tunable converter.

This device concerns an electronic tunable converter 37 provided in the terminal unit III for selecting the channel desired to be received from the TV signals containing 35 channels transmitted from the central control unit I and converting the same into a particular channel that can be received by TV receiver 40. This device is to be described by way of a preferred embodiment shown in FIG. 21, wherein a first frequency conversion section for selecting one channel from multiple channels of TV signals is composed of an input bandpass filter (referred to simply as input BPF hereinafter) 98, first frequency converter 99, first local oscillator 100 and helical bandpass filter (referred to simply as helical BPF hereinafter). A second frequency conversion section for converting 1 channel TV signals, which are selected by the above first frequency conversion section, into a particular channel that is capable of reception by a TV receiver 40 is composed of a second frequency converter 102, a second local oscillator 103 and an output bandpass filter (referred to as output BPF hereinafter) 104. Reference numeral 105 represents an AFC circuit which detects the deviation in the frequency of the TV signals and delivers control voltage outputs of varying amplitude depending on said deviation and reference numeral 106 represents an AFC control circuit which detects the changes in the output voltage from the channel selector 42 at the time of switching channels and temporarily interrupts the operation of the AFC circuit 105.

According to the above construction, when it is intended to select a channel from the TV signals containing 35 channels passed through the input BPF 98, the desired channel is set in the channel selector 42. Then, a voltage corresponding to the selected channel is set on the channel selector 42 and delivered to the first local oscillator (varactor diode) 100 to vary the oscillation frequency therein into a frequency $f_{L1}$. Expressing the frequencies of the TV signals for 35 channels that are transmitted from the central control unit I as $f_1, f_2, \ldots f_{35}$, these frequencies passed through the BPF 98 are mixed in the first frequency converter 99 with the oscillation frequency $f_{L1}$ from the first local oscillator 100 and converted into intermediate frequency signals containing two frequency components as shown by the following equation:

$$\sum_{n=1}^{35} f_n \pm f_{L1} \quad (4)$$

Among the intermediate frequency components shown in the equation (4) above, only that frequency comprising the sum of the components is taken out through the helical BPF 101 and applied to the second frequency converter 102. Although the input stage of the first frequency converter 99 is of a non-tunable type, the desired channel (frequency $f_n$) can be taken out by means of the helical BPF 101.

The intermediate frequency after passing through the helical BPF is represented as:

$$f_n + f_{L1} \quad (5)$$

The second local oscillator 103 always generates a constant oscillation frequency $f_{L2}$ which is mixed with the intermediate frequency $(f_n + f_{L1})$ in the second frequency converter 102. The second intermediate frequency component thus mixed contains, as shown by the equation (6), two frequency components and only the frequency comprising the difference of the components is taken out by way of the output BPF 104 so that a frequency corresponding to a particular channel (for example, channel 2) for the usual TV receiver 40 may be supplied. The equation (6) represents the second intermediate frequency components and the equation (7) represents that the differential frequency component is taken out by way of the BPF 104.

$$(f_n + f_{L1}) \pm f_{L2} \quad (6)$$

$(f_n + f_{L1}) - f_{L2}$ = constant (channel 2, for example in the usual TV receiver) (7)

In the AFC circuit 105, a frequency component shown in the equation (7) for the particular channel (for instance, channel 2) of the TV receiver 40 is amplified and detected by way of a frequency discriminator to obtain AFC voltage. The AFC voltage is overlapped on the channel selection voltage output from the channel selector 42 so as to automatically control the oscillation frequency from the first local oscillator 100 to thereby always enable the desired channel to be received under optimum conditions.

On the other hand, the AFC control circuit 106 always monitors the channel selection voltage delivered from the channel selector 42 and, on detecting the changes in the channel selection voltage, immediately functions to prevent the AFC circuit 105 from delivering its AFC voltage for a short time till the channel switching is completed and the operation of the first local oscillator 100 becomes stabilized. After the completion of channel selection, the AFC circuit 105 restores its normal function and controls the oscillation frequency from the first local oscillator 100 so that the desired channel can always be received under optimum conditions.

The present device used in this invention, having the foregoing construction, can function excellently as an electronic tunable converter since the circuit structure is simplified requiring lesser numbers of stages, no erroneous operation due to the pull in of AFC is caused and the operation is always stable thereby enabling the easy provision of the image controlling signal (15,750 Hz).

AFC CIRCUIT

This circuit relates to the AFC circuit 105 provided in the electronic tunable converter 37 in the terminal unit III of the two-way CATV system.

Figure 22:
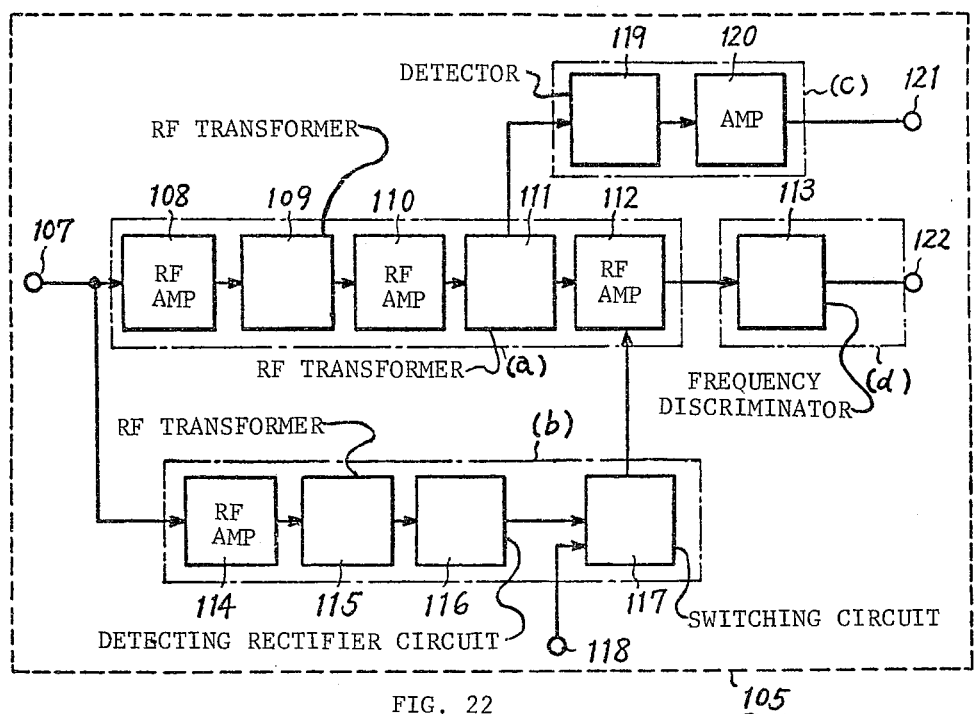
FIG. 22 is a block diagram for showing the AFC circuit of the electronic tunable converter.

FIG. 22 shows a preferred embodiment of the AFC circuit 105, wherein numeral 107 represents an input terminal for receiving the TV signals from the output BPF 104. Numerals 108, 110 and 112 represent respectively RF amplifiers, and numerals 109 and 111 represent respectively RF transformers tunable to audio carrier $f_A$ and these amplifiers constitute an audio carrier amplifying stage (a). A switching stage (b) is shown to comprise RF amplifier 114, RF transformer 115 tunable to the video signal carrier, detecting rectifier circuit 116 for the amplifier video signal carrier, switching circuit 117 and input terminal 118 for the AFC control voltage. The output of the above switching stage (b) is connected to the amplifier 112. A detector 119 connected to the above described RF transformer 111, an amplifier 120 and an output terminal 121 constitute a descrambling signal generator (c). Reference numeral 113 represents a frequency discriminator which is connected by way of an output terminal 122 to the varactor diode of the local oscillator 100 in the electronic tunable converter 37 and this discriminator 113 constitutes an AFC voltage generator (d).

Figure 23:
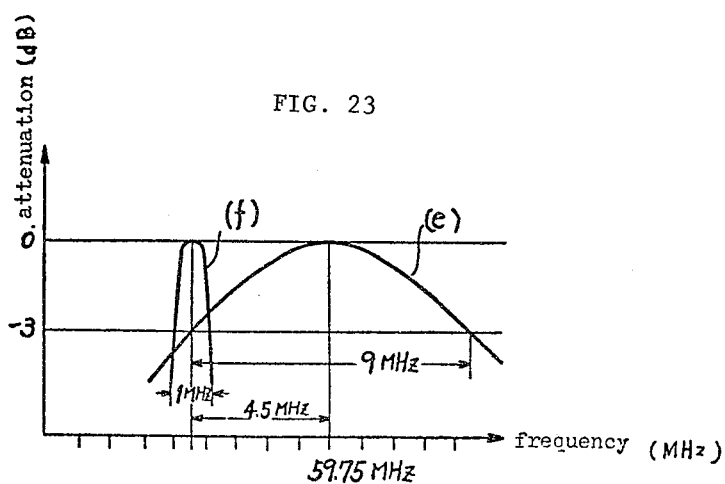
FIG. 23 is a graphical representation showing characteristics of each of the radio frequency transformers in the AFC circuit shown in FIG. 22.

In FIG. 23, (e) represents the band characteristics of the RF transformers 109 and 111, the bandwidth of which is limited to 9 MHz and the center frequency thereof is tuned to the audio carrier. (f) shows a characteristic curve for the RF transformer 115, which is tuned to a video carrier lower than the audio carrier by 4.5 MHz and the bandwidth of which is limited to 1 MHz.

Figure 24:
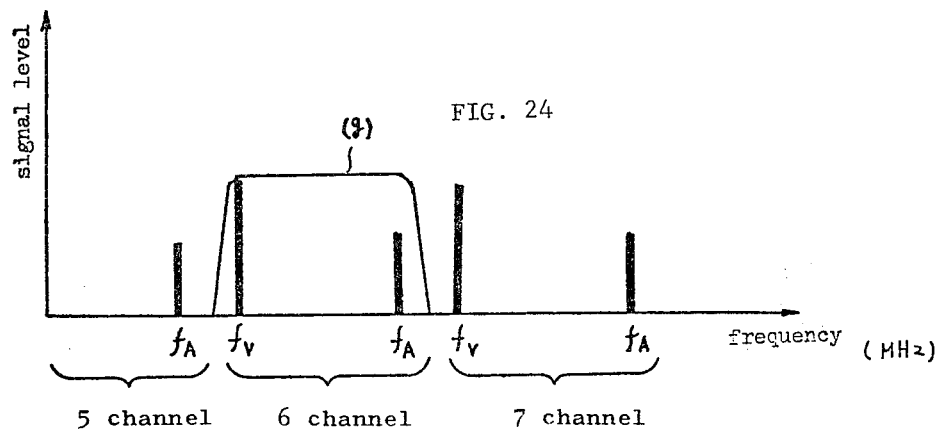
FIGS. 24 and 25 are graphical representation showing the band characteristics of the AFC circuit of FIG. 22 with the states of the video and audio carriers within each of the channels.
Figure 25:
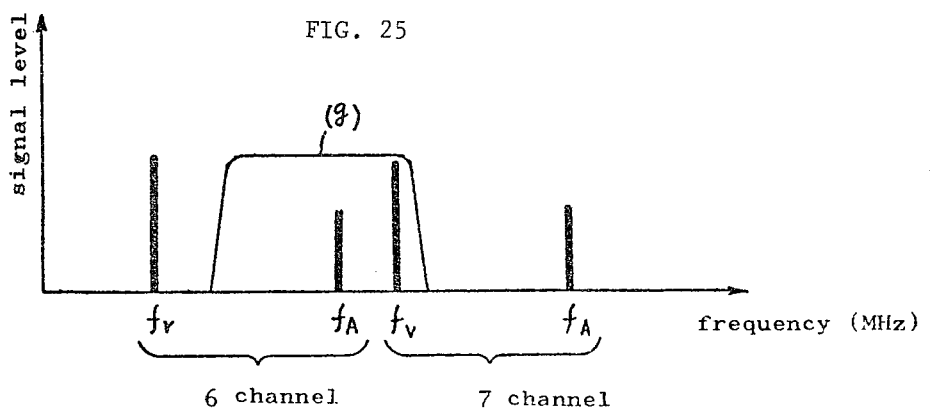

In FIGS. 24 and 25, there are shown band characteristics (g) for the AFC circuit relative to the video signal carrier $f_v$ and audio signal carrier $f_A$, with each of the numerals representing a different channel number. The normal conversion operation of the electronic tunable converter 37 is shown in FIG. 24, and FIG. 25 indicates a condition in which the normal operation of said electronic tunable converter 37 has been lost due to some reason. The input signals delivered to this circuit are those that are converted into a particular channel by way of the electronic tunable converter 37 (for example, channel 2) and the signals are applied to the input terminal 107. When the electronic tunable converter 37 operates normally for frequency conversion, the RF transformer 115 in the switching stage (b) is tuned to the video carrier. Hence, the output signal from said transformer 115 produces a DC voltage at the output of the detecting rectifier 116. This DC voltage operates the switching circuit 117 to render it conductive thereby operating the RF amplifier 112. As the result, the RF amplifying stage (a) selectively amplifies the audio carrier and the output signals therefrom are delivered to the frequency discriminator 113 causing said discriminator 113 to produce DC voltages for use with AFC operation depending upon the deviation in the frequency of the input signals. More specifically, when the frequency of the input signals to the present circuit is deviated above or below the center frequency of the foregoing transformers 109 and 111, the present circuit produces a DC voltage for AFC control which is designed to put the deviated frequency back to the respective center frequency of the foregoing transformers 109 and 111. Therefore, the electronic tunable converter 37 is subjected to automatic frequency control by way of this AFC voltage. The foregoing can be seen from FIG. 24.

If the channel control voltage for the local oscillator section in the electronic tunable converter 37 is somewhat deviated due to any reason, the transformer 115 in the switching stage produces no signals to be synchronized as shown in FIG. 25. Therefore, the detecting rectifier 116 also produces no output voltage causing the switching circuit 117 to assume a non-conductive status. Although the input terminal 118 for the AFC control voltage is usually applied with a signal which render said switching circuit 117 conductive, a signal that renders the switching circuit 117 non-conductive is temporarily applied for a short period only in the channel switching operation till the switching is completed and stable condition is restored. As the result, the RF amplifying stage (a) does not perform RF amplification and AFC voltage generator (d) produces no AFC voltage. Therefore, erroneous operation of the electronic tunable converter 37 due to the pull-in of AFC can be prevented. Because the RF amplifying stage (a) above in the AFC circuit comprises wide band amplifiers, carrier waves at a high signal level and having a frequency close to the center frequency in the bandwidth of the RF transformers 109 and 111 might be captured and said carrier waves could then be erroneously used as AFC carrier causing the tuner to tune to a channel not desired to be received. This phenomenon is referred to as AFC pull-in.

Further, in this circuit descrambling signals (15,750 Hz) overlapped on the TV signals can be taken out, detected in the detector circuit 119, amplified in the amplifier 120 and then delivered to the descrambler 38 by way of the output terminal 121.

As described above, since the AFC circuit in the present invention comprises RF amplifier stage (a) tunable to the audio carrier, switching stage (b) tunable to the video carrier, descrambling signal generator (c) and AFC voltage generator (d), various advantages can be obtained in that AFC operates always normally on receiving any of the channels with a simple circuit, no erroneous operation is caused due to AFC pull-in and descrambling signals can be obtained with a simpler circuit.

AFC CONTROL CIRCUIT

This circuit relates to the AFC control circuit 106 provided in the electronic tunable converter 37 in the terminal unit III of the two-way CATV system. As stated previously, the AFC circuit 105 is used in the electronic tunable converter 37 shown in FIG. 21 for stabilizing the converted frequency obtained from the electronic tunable converter 37. However, the oscillation frequency of the first local oscillator 100 of the electronic tunable converter 37 may be deviated due to changes in voltages in the selection of channels or like other reasons, whereby the AFC circuit 105 captures signals other than the normal ones and produces AFC voltage based on said captured signals and applies the voltage to the first local oscillator 100. Thus, the electronic tunable converter 37 is tuned to the signals other than those desired to be received and converts the same. This AFC control circuit functions to stop the operation of the AFC circuit 105 for a while to prevent such phenomenon, when a voltage applied to the first local oscillator 100 is deviated due to any reason in the selection of the channels, till the voltage becomes stablized.

Figure 26:
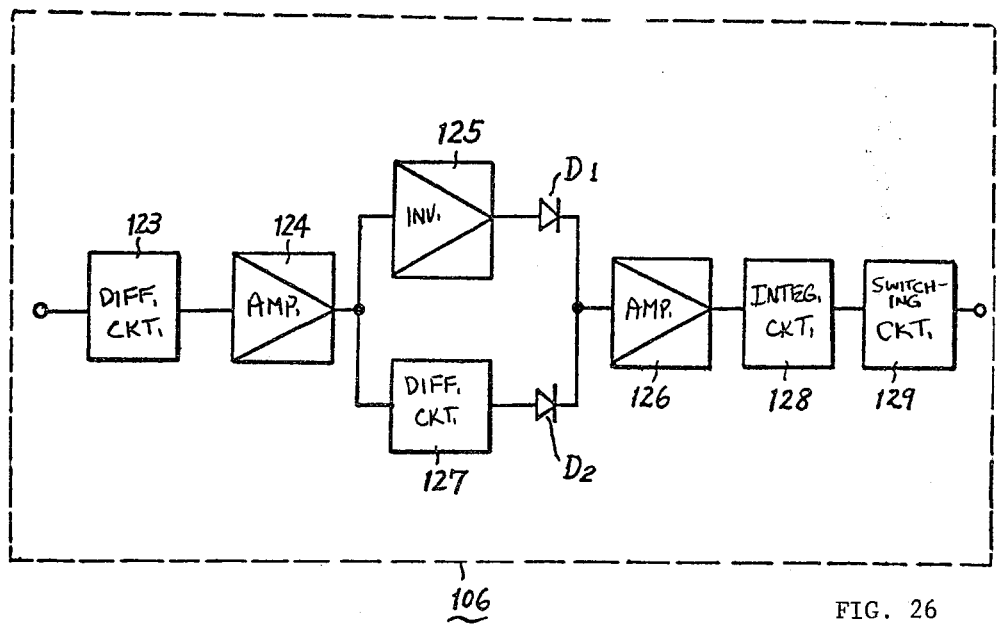
FIG. 26 is a block diagram showing the construction of an AFC control circuit.

Description is to be made for a preferred embodiment of the AFC control circuit referring to FIG. 26.

In this circuit, a differentiation circuit 123 which differentiates the changes in the channel selection voltages to be applied from the channel selector 42 to the varactor diode of the first local oscillator 100 to provide a differentiated pulse, is connected to an amplifier 124 which amplifies said differentiated pulse to a sufficient degree, and an amplifier 125 which inverts the differentiated pulse output from the amplifier 124. The output of the amplifier 125 is supplied through a diode $D_1$ to an amplifier 126. The amplifier 124 is connected to another differentiation circuit 127 so as to supply the output of the amplifier 124 also to the differentiation circuit 127, and another diode $D_2$ which passes only the positive differentiated pulse of the outputs from the differentiation circuit 127 is connected between the output terminal of the differentiation circuit 127 and the input terminal of the amplifier 126. To the output terminal of the amplifier 126 is connected an integration circuit 128 which integrates the pulse amplified in the amplifier 126, and a switching circuit 129 which remains conductive till the integrated pulse reaches a certain level is connected to the output of said integration circuit 128.

Since the channel selection voltage delivered from the channel selector 42 is applied to the varactor diode of the first local oscillator 100 to vary the oscillation frequency thereof, it changes every time when the channel is switched.

The changes in the channel selection voltages are differentiated in the differentiation circuit 123 and applied to the amplifier circuit 124 to undergo amplification. The amplification degree of the amplifier 124 is set highly enough to provide a sufficiently high differentiated pulse even from small changes in the channel selection voltage.

The amplifier 125 inverts the differentiated pulse and applies only positive pulses to the amplifier 126 through the diode $D_1$. The differentiated pulses before inversion are further differentiated by the differentiation circuit 127 and only positive pulses are applied to the input terminal of the amplifier 126 through the diode $D_2$. Therefore, when the channel selection voltage is deviated above the preset voltage, the positive differentiated pulses obtained from the amplifier 125 are applied to the amplifier 126 and, on the contrary, when the channel selection voltage is deviated below the preset voltage, the positive pulses obtained from the differentiation circuit 127 and the diode $D_2$ are applied to the amplifier 126. Thus, if the channel selection voltages are deviated either above or below the preset level, the amplifier 126 amplifies the differentiated pulses. From the differentiated pulses that are amplified through the amplifier 126, switching signals which are delayed by an optional value determined by a CR time constant of the CR integration circuit 128 can be obtained. The switching signals operate the switching circuit 129 to produce switching pulses which, in turn, put the switching circuit of the AFC circuit to off. Therefore, the AFC circuit stops its operation for a time period determined by the CR time constant of the CR integration circuit 128.

As stated above, since this circuit for use with this invention comprises a serial circuit group composed of differentiation circuit 123, amplifier 125, inversion amplifier 125 and diode $D_1$ and connected to the input terminal of the amplifier 126, and another serial circuit group composes of another differentiation circuit 127 and diode $D_2$ and connected in parallel with the circuit consisting of said amplifier 125 and diode $D_1$, switching pulses can always be obtained if the channel selection voltage is deviated either higher or lower than the preset value and, in addition, provision of the CR integration circuit 128 enables to optionally set the time period for releasing the AFC circuit thereby providing a very stable circuit.

CROSS MODULATION IMPROVING CIRCUIT

This circuit concerns the helical bandpass filter (helical BPF) 101 in the electronic tunable converter 37.

Figure 27:
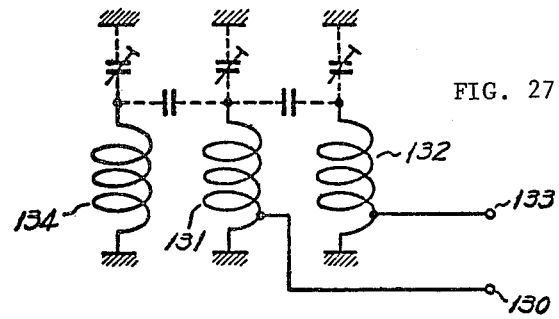
FIG. 27 is a constructional view of a notched helical band pass filter.
Figure 28:
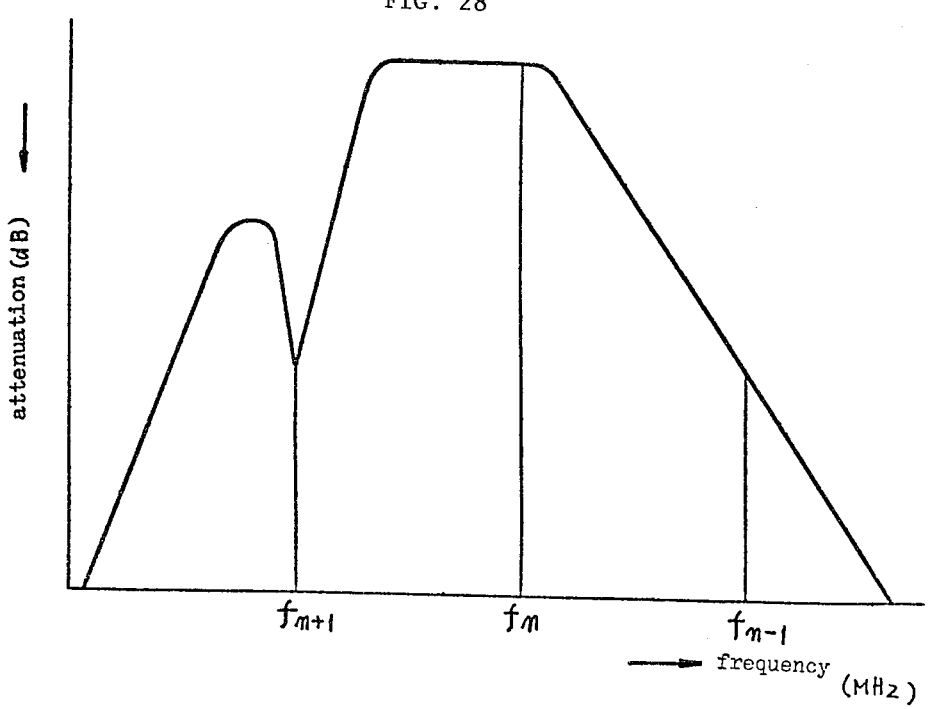
FIG. 28 shows frequency characteristics of the helical band pass filter shown in FIG. 27.

FIG. 27 shows a construction of a notched helical BPF and FIG. 28 shows the frequency characteristics of the notched helical BPF. An input terminal 130 leading the intermediate frequency delivered from the first frequency converter 99 is connected to a helical coil 131 and the capacitive coupling of said coil 131 and another helical coil 132 separately provided constitutes a bandpass filter.

An output terminal 133 for coupling the signals that pass through the bandpass filter is connected to the helical coil 132. Further, a third helical coil 134 is capacitively coupled to the other helical coils 131 and 132 to form a notch filter.

The helical BPF 101 thus constructed can improve the cross modulation as described below.

In a converter for use with CATV systems, cross modulation in each of the stages after intermediate frequency is substantially determined by the characteristics of the intermediate frequency filters. In particular, when the video carrier in a channel lying immediately above the channel desired to be received, is contained within the band of a filter, significant interference is caused because the video carrier level in the channel desired to be received and that in the channel lying immediately above said desired channel are on the same level. This circuit intends an improvement in the cross modulation by attenuating the interfering signals more than 10 dB by the use of a notched filter. In the CATV system, audio carrier level can be ignored with respect to the cross modulation in the intermediate frequency stage since it is lower than the video carrier level by 15 dB. Those interfering signals that greatly affect the cross modulation after the intermediate frequency stage are the video signals in the channel lying immediately below the channel intended to be received and the video signals in the channel lying immediately above the desired channel attenuated by means of the helical BPF 101 by about 10 dB, and all of other signals are attenuated to levels lower enough by the helical BPF 101. Reduction in the cross modulation for three types of signals after passing the helical BPF 101 are shown below.

The three types of signals after passing the helical BPF 101 are represented respectively by the following equations:

$$S_A = A \cos X \quad (8),$$

$$S_B = B \cos Y \quad (9),$$

$$S_C = C \cos Z \quad (10),$$

wherein $S_A$ are signals in the channel which is intended to be received, $S_B$ are signals in the channel which lie immediately above said intended channel for signals $S_A$, $S_C$ are signals in the channel which lie immediately below said intended channel for signals $S_A$, A is a carrier level for signals $S_A$, B is a carrier level for signals $S_B$, C is a carrier level for signals $S_C$, $X = 2\pi f_n \cdot t$, $Y = 2\pi f_{n-1} \cdot t$ and $Z = 2\pi f_{n+1} \cdot t$.

Then, since the cross modulation is caused by tertiary distortion, the tertiary term for the output voltage can be expressed taking $K_3$ as distortion coefficient in amplification in the following equation:

$$\begin{aligned}
e_3 &= K_3(S_A + S_B + S_C)^3 \\
&= K_3(A\cos X + B\cos Y + C\cos Z)^3 \\
&= \tfrac{1}{4}K_3(A^3\cos 3X + B^3\cos 3Y + C^3\cos 3Z) + \\
&\quad \tfrac{3}{4}K_3\{A^2B\cos(2X-Y) + A^2B\cos(2X+Y) + \\
&\quad A^2C\cos(2X-Z) + \\
&\quad A^2C\cos(2X+Z) + B^2A\cos(2Y-X) + B^2A\cos(2Y+X) \\
&\quad + \\
&\quad B^2C\cos(2Y-Z) + B^2C\cos(2Y+Z) + C^2A\cos(2Z-X) \\
&\quad + \\
&\quad C^2A\cos(2Z+X) + C^2B\cos(2Z-Y) + C^2B\cos(2Z+Y)\} \\
&\quad + \\
&\quad 3/2K_3ABC\{\cos(X-Y-X) + \cos(X+Y+X)\} + \\
&\quad \tfrac{3}{4}K_3(A^3\cos X + B^3\cos Y + C^3\cos Z) + \\
&\quad 3/2K_3(AB^2\cos X + AC^2\cos X + BA^2\cos Y + BC^2\cos Y \\
&\quad + \\
&\quad CA^2\cos Z + CB^2\cos Z)
\end{aligned} \quad (11)$$

In the above equation, the last term represents the cross modulation component and the cross modulation component in the channel which is intended to be received is:

$$I = 3/2K_3(AB^2\cos X + AC^2\cos X) = 3/2K_3A(B^2 + C^2)\cos X = I_O \cos X, \text{ wherein}$$
$$I_O = 3/2K_3A(B^2 + C^2).$$

The cross modulation can be defined as the ratio of the level $I_O$ for the cross modulation component to the carrier level A in the channel which is intended to be received. The cross modulation XM can be expressed as:

$$XM = 20\log\frac{I_O}{S_A} = 20\log\frac{3/2K_3A(B^2+C^2)}{A} \quad (12)$$
$$= 20\log\{3/2K_3(B^2 + C^2)\}$$

The helical BPF in the prior art comprises two helical coils and, in the helical BPF of this type, the carrier level B in the channel immediately above the channel to be received is not attenuated and lies on approximately the same level as that of the carrier level A of the signals $S_A$. However, the carrier level C for the signals $S_C$ after passing through said helical BPF is attenuated lower than the carrier level A for the signals $S_A$ by 10 dB. The cross modulation XM is represented then as:

$$XM = 20\log\left\{3/2K_3(A^2 + \frac{A^2}{10})\right\} = 20\log\left(\frac{33}{20}K_3A^2\right) \quad (13)$$

Then, a notch filter is provided to the helical BPF as in the present invention, the carrier level B for the signals $S_B$ is attenuated below the carrier level A for the signals $S_A$ by 10 dB and, hence, the cross modulation XM can be presented as:

$$XM_H = 20\log\left\{3/2K_3(\frac{A^2}{10} + \frac{A^2}{10})\right\} = \quad (14)$$

-continued $$20 \log \left( \frac{3}{10} K_3 A^2 \right)$$

The difference of the above XM and $XM_H$ is represented as:

$$XM - XM_H = 20 \log \left( \frac{33}{20} K_3 A^2 \right) - 20 \log \left( \frac{3}{10} K_3 A^2 \right) \quad (15)$$

$$= 20 \log \left( \frac{11}{2} \right)$$

$$= 14.1 \text{ dB}$$

As apparent from the foregoing, the provision of the notch filter can significantly decrease the cross modulation. In the present invention, three helical coils are provided, two constituting the similar helical BPF as in the prior art and the other one forming a notch filter thereby providing a notched helical BPF with lesser numbers of filter stages and having effective filter characteristics, which can make an improvement in the cross modulation.

AGC DEMODULATOR

This device concerns the image control device (descrambler) 38 in the terminal unit III of the scrambler system which is used for restoring normal RF-TV composite signals from the image distorted RF-TV composite signals.

Figure 29:
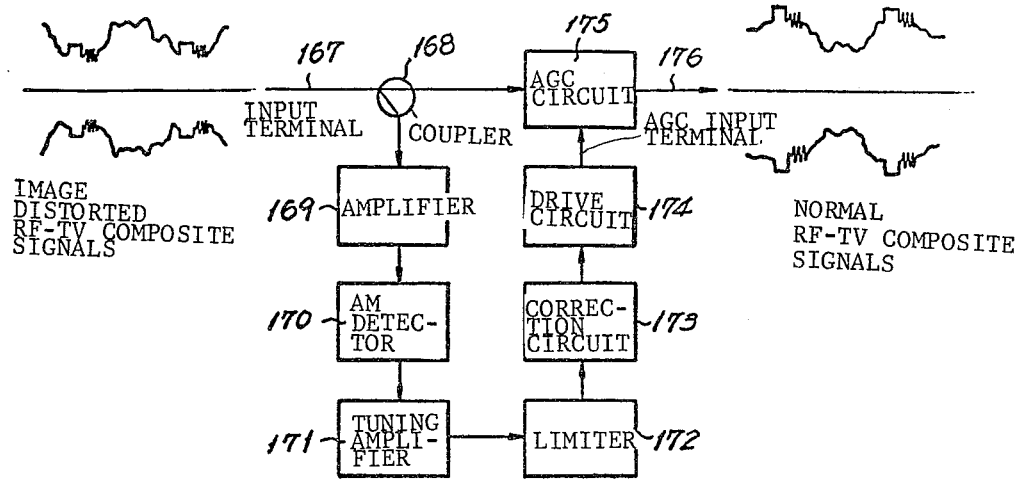
FIG. 29 is a block diagram of a signal restoring circuit exemplified as an AGC demodulator, together with the waveforms of input and output signals.
Figure 30:
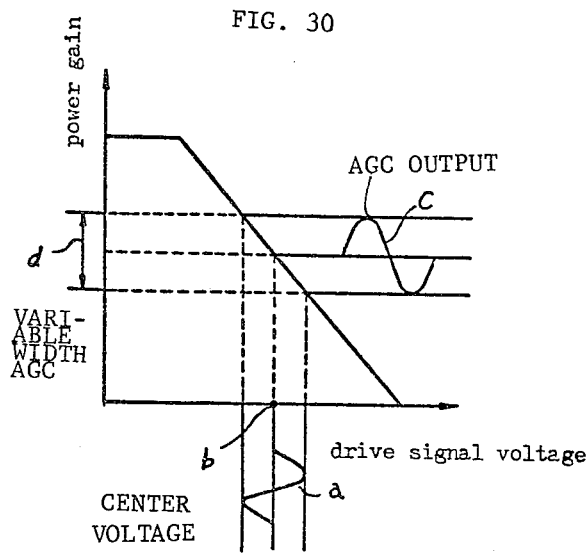
FIG. 30 is a graphical representation illustrating the relation between the driving signal voltage vs RF power gain in the signal restoring circuit shown in FIG. 29 for explanation of the dynamic condition of the AGC circuit.
Figure 31:
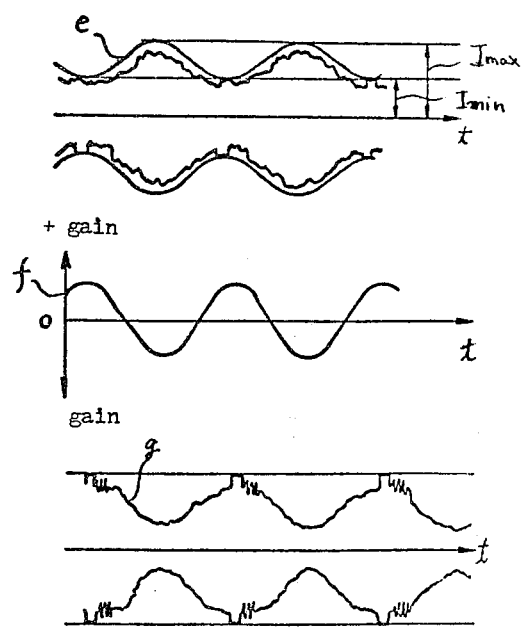
FIG. 31 is a graphical representation of waveforms generated in the operation of the circuit of FIG. 29.

The present device is to be described based on FIGS. 29, 30 and 31.

In FIG. 29, there are shown an input terminal 167 for image distorted RF-TV composite signals, a coupler 168 for branching and matching said RF-TV composite signals, an amplifier 169 for amplifying audio carrier of the composite signals branched through the coupler 168, and an AM detector 170 connected to said amplifier 169. Numeral 171 denotes a tuning amplifier for driving signals adapted to amplify the output signals from the AM detector 170 and apply the same to a limiter 172. Numeral 173 represents a correction circuit for the phase and the level of the driving signal, and numeral 174 represents a drive circuit, driving signals from the output of which are applied to the AGC input terminal of an AGC circuit 175. The AGC circuit 175 has an input connected with one of the branching ends of the coupler 168 and another input connected with said drive circuit 174 and further has an output for coupling signals converted into the normal RF-TV composite signals to external circuits (not shown).

The operation of the present device having the foregoing construction is described below.

The RF-TV composite signals applied to the input terminal 167 for said RF-TV composite signals are branched through the coupler 168 and then applied to the AGC circuit 175 and to the amplifier 169. The amplifier 169 selects the audio FM carrier from the RF-TV composite signals, amplifies said audio FM carrier to a sufficient degree and then applies the same to the detector 170. The audio FM carrier is detected with their AM components in the detector 170 and subjected to a limitation through the limiter 171 and then applied to the correction circuit 173. Basic fundamental waves are taken out from the limited signals by way of the correction circuit 173, corrected in phase and level and then applied to the drive circuit 174. The drive circuit 174 limits the amplification degree of the AGC circuit 175 with the foregoing corrected signals. FIG. 30 illustrates that the amplification degree of the AGC circuit is limited, wherein characteristics of power gain vs driving signal voltage are shown together with AGC driving signal a, center voltage b of said driving signal, AGC output c and variable width d for AGC. When RF-TV composite signals are amplitude modulated to a certain modulation degree as shown in e in FIG. 31, the variable width A for the AGC can be represented as $A = \pm |10 \log I_{min}|$, wherein the minimum value of the amplitude of the modulation waves is $I_{min}$ and the maximum value $I_{max}$ thereof is 1 relative to the zero level of the carrier. As shown in (e) and (f) in the figure, the driving signals are applied to the AGC circuit 175 in such a phase relation as providing $+A$ gain (dB) for the bottom and $-A$ gain (dB) for the top of the RF-TV composite signals. In other words, normal RF-TV composite signals can be obtained as shown in (g) in the figure by performing AGC operation in the gain control range of $\pm A$ (dB) with the driving signals opposite, in the phase, to said RF-TV composite signals. Particularly, in the present demodulator, demodulation can be performed stably by the provision of the limiter 172 and due to the constant level of the driving signals even when the input level for the RF-TV composite signals should vary.

In addition, since the AGC circuit 175 has a wide linear range in its dynamic characteristics, this AGC circuit can operate also as a descrambler as well as usual AGC device by adding, to the descrambling signals, conventional AGC signals.

Since the present device, as described above, has circuits 169, 170 and 171 for separating descrambling signals superposed on image distorted RF-TV composite signals, a limiter 172, a phase correction circuit 173 and a drive circuit 174 for AGC driving, and it is constructed so that the AGC circuit 175 is controlled with the output signals of said driving circuit 174, the following advantages can be obtained. Since descrambling is performed at the RF stage, and AGC circuit used in the RF circuit (electronic tunable converter section) can be utilized as it is, which simplifies the structure and reduces the device costs. Also, the AGC demodulating circuit operates as a usual amplifier for the composite signals not distorted with images and, therefore, has no effects on the channels other than pay-TV channels. In addition, if a TV receiver 40 is operated without using the descrambler 38, the scrambling effects are significantly increased by adding white noise or audio signals as the driving signals and the images can be distorted thoroughly and rendered unintelligible.

AUXILIARY CONVERTER IN THE TERMINAL UNIT

This device concerns the auxiliary converter for use in the terminal unit III.

Description is to be made for the embodiment shown in FIG. 32, wherein reference numeral 37 represents an electronic tunable converter which selects a channel from the TV signals containing 35 channels transmitted from the central control unit I and converts it to a particular channel (for example, channel 2), numeral 38 represents a descrambler which reproduces television signals scrambled with TV signals converted to the particular channel into normal signals to restore normal video images and numeral 39 represents an auxiliary converter which converts the above described particular channel to another channel depending on radio wave conditions and the like.

With the construction described above, the output signals from the electronic tunable converter 37 which are usually converted to a particular channel (for instance, channel 2) can further be converted to another channel. In the present converter, a particular channel (for example, channel 2) is converted further into other channel (for example, channel 3), and the converter is so adapted that several types of such reconverted channels can be set (for example, from channel 2 to channel 3, from channel 2 to channel 11 or from channel 2 to channel 12 and the like). The output channel of the electronic tunable converter 37 is fixed for the ease of mass production and adjustment thereof as well as quality control and maintenance thereof. When a channel is required to be changed due to the alteration in the channel plan, differences in the conditions of the radio waves depending on the service areas and the requests of the channel alteration to other particular channel and the like, the alteration to the other channel due to these reasons needs extremely precise adjusting techniques and rapid alteration service cannot be expected. The additional provision of the foregoing auxiliary converter 39 saves the adjustment for the electronic tunable converter 37 in such alteration.

As foregoing, by the provision of the auxiliary converter 39 between the electronic tunable converter 37 and the TV receiver 40, remarkable advantages can be expected in that channels can be altered easily, fabrication cost and controlling costs in the factories can be reduced significantly, and channel alteration can rapidly be made in the radio wave interference area.

POWER SENSOR

The power sensor 41 is a device for detecting the on-off status of the power source for the TV receiver 40 in the terminal unit III.

A preferred embodiment of the device is shown in FIG. 33, wherein there are shown a rectifier diode 190, and voltage divider resistors 191 and 192 connected in series with each other and led to the junction points A and B with a capacitor 193 being connected in parallel with said resistor 192 to thereby form a DC power supply for the present device. The reference numeral 195 represents a relay coil connected in parallel with a capacitor 194 and connected via collector-emitter of a transistor 196 across the capacitor 193 above. Between the base and emitter of the transistor 196 is connected a parallel circuit, composed of a resistor 197, diodes 198 and 199 and diode 200, by way of a resistor 201. The power source for the TV receiver 40 is supplied from the above described point A and the junction point C in the figure. The rectifier circuit composed of the diode 190, resistors 191 and 192, and the capacitor 194 supplies a well filtered DC voltage to the circuit concerned. When the power switch of the TV receiver 40 is closed, a first half cycle of AC current flows through the diodes 198 and 199 to generate a voltage in a forward direction. In the succeeding opposite half cycle, AC current flows through the diode 200 to generate a voltage in the forward direction whereby these forward voltages have no substantial effects such as ripple or the like on the AC line. The forward voltage generated across the diodes 198 and 199 in the half cycle during which the AC current flows through said diodes 198 and 199 renders the transistor 196 conductive and, as a result, causes the current to flow through the relay coil 195 to actuate said relay.

Also, during the opposite half cycle during which the current flows through the diode 200, the transistor 196 is biased backward and the charges stored in the capacitor 193 initiates the discharges through the relay coil 195 to thereby keep the relay actuated. In this manner, the relay is kept operated so long as the power switch for the TV receiver 40 is closed.

It may some time happen, however, that the transistor 196 operates even if the power switch for the TV receiver 40 has been opened, because the preheater current always present in the TV receiver 40 causes some current to flow in the diodes 198 and 199 of the power sensor 41 to thereby operate said transistor 196. In order to prevent the transistor 196 from such erroneous operation, the resistor 197 is connected in parallel with said diodes 198 and 199.

When the preheater current is present, that is, a lower current flows through the diodes 198 and 199, the equivalent resistance value $R_s$ of the diodes 198 and 199 shows a high value. Therefore, by setting the value of the resistor 197 lower than the equivalent resistance value $R_s$ of the diodes, the transistor 196 being supplied with a bias corresponding to the voltage across the resistor 197, is not rendered conductive.

On the contrary, when the power switch for the TV receiver 40 is closed, higher current flows through the diodes 198 and 199 and the equivalent resistance value $R_L$ thereof is lower than the value of the resistor 197. Hence, the transistor 196, being biased with a voltage corresponding to that across the equivalent resistor $R_L$, is rendered conductive.

As can be seen from the foregoing, by selecting the value of the resistor R4 so as to satisfy the relation:

$$R_S > R_4 > R_L$$

the device can be operated as a power sensor 41 only while a high current is supplied and prevent the transistor 196 from erroneous operation while a lower current is supplied.

For instance, in order to design the power sensor 41 so as not to be operated with the electrical power less than 20 W, it is constructed as below. Assuming the forward voltage for a diode as $V_D = 0.7$ V and AC power source voltage E as 100 V, the current $I_D$ flowing through the diodes can be represented as:

$$I_D \approx \frac{20}{E} = \frac{20}{100} = 0.2(A)$$

Hence, the equivalent resistance $R_{S1}$ for one diode is shown as:

$$R_{S1} \approx \frac{V_D}{I_D} = \frac{0.7}{0.2} = 3.5(\Omega)$$

Since the diodes 198 and 199 are connected in series, the total equivalent resistance for the diodes is twice as large as the value for the equivalent resistance $R_{S1}$, that is, $R_S = 2R_{S1}$. Therefore, the resistor 197 may have a value of about $7\Omega$ and, practically somewhat less than $7\Omega$ in view of the phase in the current and the conduction angle in the diodes. As described above, this power sensor 41 can detect the on-off status of the power source with simple circuitry with no modifications to the TV receiver 40 and causes no erroneous operation if preheater current is present. Moreover, the output of the power sensor can be insulated electrically from the power line.

While a number of alternatives and variations have been described, it is to be understood that the invention encompasses all forms and modifications falling within the scope of the appended claims.

What is claimed is:

1. In a CATV system having a central computer at a central station, a multi-channel program generator for generating programs, some of which are premium programs requiring payment and others of which are restricted premium programs to be available only to predetermined subscribers, and a plurality of individual subscriber terminals each controlling program selection for an associated TV set and coupled by a cable system to the central station, the combination comprising:

means disposed at said central station and coupled to the multi-channel program generator for transmitting scrambled program signals on all premium channels;

means for subscriber program selection at each subscriber terminal;

selectively operable converter means and controllable descrambling means at each subscriber terminal for providing descrambling of premium programs in a selected channel in response to program selection, said converter means comprising variable frequency oscillator means coupled to provide selected programs in a single chosen channel, and further including means responsive to components of the program signals for precisely adjusting the frequency of the variable frequency oscillator;

terminal processor means disposed at each of said terminals coupled to respond to said means for program selection and externally supplied command signals and coupled selectively to control reception of programs;

means at each subscriber terminal coupled to said terminal processor means for indicating authorization by the subscriber for premium program payment and wherein said terminal processor means inhibits reception of premium programs in the absence of an indication of authorization;

means at each subscriber terminal responsive to the processor means thereat and to an identifying address for the terminal for transmitting an encoded upstream data message as to terminal status to the central station;

central processor means coupled to the transmission network for transmitting successive messages to the different subscriber terminals, said messages including identifying addresses and command signals containing subscriber data; and means disposed at said central station and responsive to subscriber selection and received upstream messages for transmitting commands selectively to inhibit reception of premium programs and to enable reception of requested restricted premium programs under central control and for recording only change of status at the subscriber terminals relative to premium programs, whereby the system monitors premium program usage in real time and access to premium and restricted premium programming is centrally controllable without modification of the subscriber terminal.

2. The invention as set forth in claim 1 above, wherein said means for controlling the frequency comprises means responsive to the average level of the audio carrier component of the program signals for providing a control signal of selected nominal level to the variable frequency oscillator.

3. The invention as set forth in claim 2 above, wherein said means for program selection comprises means providing a plurality of selectable control voltages, and said converter means further comprises means responsive to changes in said selectable control voltages for disabling said means for providing a control signal for a selected interval after each change to prevent an AFC pull-in effect.

4. In a CATV system having a central computer at a central station, a multi-channel program generator for generating programs, some of which are premium programs requiring payment and others of which are restricted premium programs to be available only to predetermined subscribers, and a plurality of individual subscriber terminals each controlling program selection for an associated TV set and coupled by a cable system to the central station, the combination comprising:

means disposed at said central station and coupled to the multi-channel program generator for transmitting scrambled program signals on all premium channels;

means for subscriber program selection at each subscriber terminal;

selectively operable converter means and controllable descrambling means at each subscriber terminal for providing descrambling of premium programs in a selected channel in response to program selection;

terminal processor means disposed at each of said terminals coupled to respond to said means for program selection and externally supplied command signals and coupled selectively to control reception of programs;

means at each subscriber terminal coupled to said terminal processor means for indicating authorization by the subscriber for premium program payment and wherein said terminal processor means inhibits reception of premium programs in the absence of an indication of authorization;

means at each subscriber terminal responsive to the processor means thereat and to an identifying address for the terminal for transmitting an encoded upstream data message as to terminal status to the central station;

central processor means coupled to the transmission network for transmitting successive messages to the different subscriber terminals, said messages including identifying addresses and command signals containing subscriber data;

means disposed at said central station and responsive to subscriber selection and received upstream messages for transmitting commands selectively to inhibit reception of premium programs and to enable reception of requested restricted premium programs under central control and for recording only change of status at the subscriber terminals relative to premium programs, whereby the system monitors premium program usage in real time and access to premium and restricted premium programming is centrally controllable without modification of the subscriber terminal;

power means at each of said terminals for enabling a subscriber's TV set to be plugged in for power, and including power sensor circuit means responsive to the level of power utilized to provide an indication of TV receiver operation to said terminal processor means; and wherein said terminal processor means is coupled to inhibit reception in the absence of an indication of TV receiver operation.

5. The invention as set forth in claim 4 above, wherein said terminal signal processor means includes means responsive to a change in the indication of TV receiver operation for switching said converter means to a selected channel to provide a refresh mode.

6. The invention as set forth in claim 5 above, wherein said system further includes actuable switch means providing a control voltage to said converter means, and circuit means responsive to said power sensor circuit means for activating said switch means.

7. In a CATV system having a two-way data transmission coupling between each of a plurality of subscribers terminals and a central station the combination comprising:

central station program transmission means for transmitting unscrambled non-premium programs, and scrambled premium and restricted premium programs on different ones of multiple channels;

central station data transmission means for successively interrogating individual subscribers terminals, said data transmission means providing a fixed length group address message for all subscribers in a group and subsequent fixed length downstream messages containing private address and command data for controlling reception of restricted premium programs;

program selection means disposed at each subscriber terminal;

controllable descrambler means disposed at each terminal for automatically descrambling selected premium programs;

processor means at each terminal responsive to said program selection means and to downstream messages for transmitting pre-selected fixed length upstream messages as to program status when the appropriate private address is provided in a downstream message, said processor means being responsive to the appropriate private address only when immediately preceded by the proper group address and including means for enabling reception when the terminal is authorized to receive a restricted premium program, and terminating reception when the terminal is not authorized to receive a premium program; and central station independent timer means responsive to the occurrence of successive messages for indicating the existence of fault conditions in data transmission.

8. In a CATV system having a two-way data transmission coupling between each of a plurality of subscribers terminals and a central station the combination comprising:

central station program transmission means for transmitting unscrambled non-premium programs, and scrambled premium and restricted premium programs on different ones of multiple channels;

central station data transmission means for successively interrogating individual subscribers terminals, said data transmission means providing a fixed length group address message for all subscribers in a group and subsequent fixed length downstream messages containing private address and command data for controlling reception of restricted premium programs;

program selection means disposed at each subscriber terminal;

controllable descrambler means disposed at each terminal for automatically descrambling selected premium programs;

processor means at each terminal responsive to said program selection means and to downstream messages for transmitting pre-selected fixed length upstream messages as to program status when the appropriate private address is provided in a downstream message, said processor means being responsive to the appropriate private address only when immediately preceded by the proper group address and including means for enabling reception when the terminal is authorized to receive a restricted premium program, and terminating reception when the terminal is not authorized to receive a premium program; and undelayed response means at each terminal comprising a continually operating oscillator, gated frequency divider means activated in response to an appropriate downstream message, and means coupled to the processor means for keying the output of the frequency divider means with an upstream data message.

9. In a CATV system having a plurality of subscribers, a system for addressing any selected individual subscriber on an asynchronous basis with a sufficiently short message such that all subscribers can be addressed within a relatively short time interval, the combination comprising:

a transmission network including a main trunk, branch amplifiers coupling the main trunk to a plurality of branches and distribution means coupling each of the branches to an individual subscriber's location, the branches being arranged in groups;

transmitting means for concurrently transmitting video programs and data messages in different parts of the frequency spectrum on said network;

coding means coupled to said transmitting means for encoding messages for said individual subscribers, said messages comprising sync, group address, private address and command data, the sync data comprising a selected sequence of binary-valued representations of one value, the data patterns being bisected by a binary-valued signal of the opposite value to the sync data value into bit sequence lengths that are shorter than the length of the sync bit sequence; and means disposed at the subscriber terminals for responding to the appropriate private address.

10. The invention as set forth in claim 9 above, wherein said network means includes means responsive to said group address signals for blocking signals from the branches that are other than in the selected group.

11. The invention as set forth in claim 9 above, wherein said encoding means provides frequency shift keyed biphase signals, and wherein said means at the subscriber terminals includes bandpass filter means.

12. The invention as set forth in claim 9 above, wherein said encoding means provides two different frames of data for a group of individual subscribers, a first of said frames comprising a synchronizing bit sequence followed by two groups of group address sequences separated by a bisecting bit and the second of said frames comprises an initial synchronizing bit sequence followed by a first and second private address portion separated by a bisecting bit, and a data command bit portion.

13. The invention as set forth in claim 12 above, wherein said means responsive to the transmitted signals at the subscriber's unit respond to the second frame only if the group address for their group is correctly identified in a prior first frame.

14. The invention as set forth in claim 13 above, wherein said means at the subscriber terminals includes means for reordering the return message to provide higher priority indications under predetermined circumstances.

15. The invention as set forth in claim 11 above, wherein said means for transmitting information from said terminal comprises a continuously operable oscillator and frequency dividing means coupled to the output thereof, and means for rendering said frequency divider means operable to commence undelayed generation of a response frequency.

16. In a two-way CATV system having a plurality of subscriber terminals coupled by a cable network to a central station and interchanging digital data messages with the central station when interrogated, downstream messages to the terminals being frequency shift keyed fixed length messages including address and command information, and upstream messages being phase shift keyed fixed length messages including subscriber terminal status and optional additional information, the terminals each including address recognition, data assembly and data storage circuits for preparing upstream messages for transmission in response to interrogation, a system for rapid and reliable interrogation of a large number of terminals in variable sequences comprising:

central station transmitter means providing downstream message frames including a fixed length initial synchronizing sequence of like bits, and further including fixed length data sequences of shorter length than the synchronizing sequence and separated by bisecting bits of opposite binary value to the bits of the synchronizing sequence, the data sequence including at least one address sequence; and means at each terminal responsive to the downstream message frame for generating an upstream message frame having an initial synchronizing sequence of like bits and subsequent data sequences of shorter length than the synchronizing sequence and being separated by bisecting bits of opposite binary value to the bits of the synchronizing sequence, the upstream message frame being shorter than the downstream message frame, whereby messages comprising short frames can be transmitted at arbitrary times through the message network and the data can be detected reliably by pre-synchronizing the received messages.

17. The invention as set forth in claim 16 above, wherein the upstream and downstream messages each comprise biphase signals with internal clocking.

18. The invention as set forth in claim 16 above, wherein said central station transmitter means provides a unique group address message frame for a plurality of terminals, followed by a succession of private message frames each including private address and command data, and wherein said system further includes means for disabling all of the terminals in non-addressed groups.

19. The invention as set forth in claim 18 above, wherein said terminals each in addition include means for assembling terminal information on a priority basis, and further means for including highest priority information in the upstream message, to the capacity of the data portion thereof.

20. The invention as set forth in claim 19 above, wherein said system further includes, at each terminal, a continuously running oscillator having a selected frequency, gated frequency divider means coupled to provide a divided frequency output signal as a basis for generation of the upstream message upon application of a controlled signal, and means responsive to the reception of the appropriate private address interrogation for providing a controlled signal to initiate operation of said gated frequency divider means.

21. The invention as set forth in claim 20 above, wherein said system further includes means at said central station for interrupting the interrogating sequence, and first means for controlling said means for interrupting in response to the failure to detect a receiving message at greater than a predetermined interval after transmission of a downstream message, and second means for causing an interrupt in response to the occurrence of greater than a predetermined delay between successive received messages.

22. In a two-way CATV system in which upstream and downstream digital data are transmitted in frequency multiplexed fashion between a central station and a plurality of subscriber terminals, the combination comprising:

central station transmitter means providing fixed length downstream message frames; and terminal transmitter means providing fixed length upstream message frames in response to downstream message frames, downstream and upstream message frames each having an initial fixed length synchronizing sequence of binary digits of a given value, and being followed by at least two fixed length sequences of binary value data, each shorter in length than the initial sequence, and separated by a bisecting bit of opposite binary value to the binary value of the synchronizing sequence bits, wherein the upstream message is shorter in length than the downstream message.

* * * * *

UNITED STATES PATENT AND TRADEMARK OFFICE
CERTIFICATE OF CORRECTION

PATENT NO. : 4,245,245

DATED : January 13, 1981

INVENTOR(S) : Katsuaki Matsumoto et al

It is certified that error appears in the above-identified patent and that said Letters Patent are hereby corrected as shown below:

Column 2, line 56, "illustration" should read --illustrative--. Column 6, line 30, after "the" (second occurrence), "contacted" should read --contracted--. Column 7, line 28, "monocable" should read --mono-cable--. Column 10, line 35, "prsent" should read --present--. Column 13, line 1, after "switch", strike "for"; line 1, after "inhibiting", insert --for--. Column 17, line 51, after "the", strike "time" and substitute --same--. Column 19, line 26, after "required", strike the period ("."); line 48, after "terminal" and before "processor", insert --signal--. Column 23, line 64, after "timer-2", strike the double apostrope (" '' ") and substitute with a closed quotation mark (--"--).

Column 25, line 63, "$\overline{Q_1 \cdot Q_2}$" (first occurrence) should read --$\overline{Q_1 \cdot Q_2}$--. Column 32, line 65, after "amplifier", "125" should read --124--. Column 38, line 51, after "$I_D$", the symbol for approximately ("$\approx$") should read an equal symbol

UNITED STATES PATENT AND TRADEMARK OFFICE
CERTIFICATE OF CORRECTION

PATENT NO. : 4,245,245
DATED : January 13, 1981
INVENTOR(S) : Katsuaki Matsumoto et al Page 2 of 2

It is certified that error appears in the above-identified patent and that said Letters Patent are hereby corrected as shown below:

--=--; line 57, after "$R_{SL}$", the symbol for approximately ("$\approx$") should read an equal symbol --=--.

Signed and Sealed this

Ninth Day of June 1981

[SEAL]

Attest:

RENE D. TEGTMEYER

*Attesting Officer*     *Acting Commissioner of Patents and Trademarks*